(12) United States Patent
Ebihara

(10) Patent No.: US 12,412,386 B2
(45) Date of Patent: Sep. 9, 2025

(54) DETERMINATION DEVICE, DETERMINATION METHOD, AND RECORDING MEDIUM

(71) Applicant: NEC Corporation, Tokyo (JP)

(72) Inventor: Akinori Ebihara, Tokyo (JP)

(73) Assignee: NEC CORPORATION, Tokyo (JP)

( * ) Notice: Subject to any disclaimer, the term of this patent is extended or adjusted under 35 U.S.C. 154(b) by 926 days.

(21) Appl. No.: 17/622,914

(22) PCT Filed: May 11, 2020

(86) PCT No.: PCT/JP2020/018864
§ 371 (c)(1),
(2) Date: Dec. 27, 2021

(87) PCT Pub. No.: WO2021/229654
PCT Pub. Date: Nov. 18, 2021

(65) Prior Publication Data
US 2022/0254153 A1    Aug. 11, 2022

(51) Int. Cl.
*G06N 20/00* (2019.01)
*G06V 10/70* (2022.01)
*G06V 10/774* (2022.01)

(52) U.S. Cl.
CPC ............ *G06V 10/87* (2022.01); *G06V 10/774* (2022.01); *G06N 20/00* (2019.01)

(58) Field of Classification Search
CPC ..................................................... G06V 10/87
(Continued)

(56) References Cited

U.S. PATENT DOCUMENTS

2008/0133245 A1*   6/2008   Proulx .................... G06F 40/55
                                                                  704/277
2009/0087847 A1   4/2009   Lo et al.
(Continued)

FOREIGN PATENT DOCUMENTS

JP    2017-040616 A    2/2017
JP    2019-013245 A    1/2019
(Continued)

OTHER PUBLICATIONS

International Search Report for PCT Application No. PCT/JP2020/018864, mailed on Jul. 28, 2020.
(Continued)

*Primary Examiner* — Ruay Ho

(57) ABSTRACT

A determination device includes an acquisition unit that sequentially acquires a plurality of elements included in series data related to a classification target, a score calculation unit that calculates an integrated score for binary classification of the classification target each time the acquisition unit acquires the elements, a threshold value determining unit that determines an upper limit threshold value and a lower limit threshold value of the integrated score each time the acquisition unit acquires the elements, and a class determination unit that determines a determination result of the binary classification as one of a first class, a second class, and class indetermination, on the basis of comparison between the integrated score and the upper limit threshold value and the lower limit threshold value each time the acquisition unit acquires the elements.

6 Claims, 18 Drawing Sheets

(58) Field of Classification Search
USPC .......................................... 706/20; 704/277
See application file for complete search history.

(56) References Cited

U.S. PATENT DOCUMENTS

| | | | |
|---|---|---|---|
| 2013/0041966 A1 | 2/2013 | Duan | |
| 2019/0164627 A1* | 5/2019 | Blocker | G16B 5/20 |
| 2019/0355438 A1* | 11/2019 | Venn | G16B 40/00 |
| 2021/0142910 A1* | 5/2021 | Hafez | G06N 5/01 |
| 2021/0215788 A1* | 7/2021 | Hu | G01S 13/56 |

FOREIGN PATENT DOCUMENTS

| | | | |
|---|---|---|---|
| JP | 2019139442 A | * | 8/2019 |
| JP | 2019159885 A | * | 9/2019 |

OTHER PUBLICATIONS

Hakan Karsilar et al., "Speed accuracy trade-off under response deadlines", Frontiers in Neuroscience, vol. 8, Article 248, pp. 1-18, 2014.

* cited by examiner

DETERMINATION DEVICE, DETERMINATION METHOD, AND RECORDING MEDIUM

This application is a National Stage Entry of PCT/JP2020/018864 filed on May 11, 2020, the contents of all of which are incorporated herein by reference, in their entirety.

TECHNICAL FIELD

Some non-limiting embodiments relate to a determination device, a determination method, and a recording medium.

BACKGROUND ART

One of class classification methods is a method of sequentially acquiring data and repeating determination of class classification until a predetermined condition regarding the certainty of a class classification result is satisfied.

For example, Patent Document 1 discloses a Down's syndrome detection method in which the sequential probability rational test (SPRT) is used to determine whether or not the degree of over-appearance of PLAC4 alleles in blood plasma is statistically significant. In this method, on the basis of results of PCR analysis on diluted samples, it is determined whether the alternative hypothesis that trisomy 21 is detected or the null hypothesis that trisomy 21 is not detected is acceptable. If neither hypothesis is acceptable, in this method, additional analysis is performed until either hypothesis is acceptable.

PRIOR ART DOCUMENTS

Patent Documents

[Patent Document 1]
Japanese Unexamined Patent Application, First Publication No. 2019-013245

SUMMARY

Problems to be Solved

In a case where data is sequentially acquired and determination of class classification is repeated until a predetermined condition regarding the certainty of a class classification result is established, it is preferable to be able to dynamically adjust the relationship between the classification accuracy and the time required for classification.

An example of an object of some non-limiting embodiments is to provide a determination device, a determination method, and a recording medium capable of solving the above problem.

Means for Solving the Problems

According to a first aspect, there is provided a determination device including an acquisition unit that sequentially acquires a plurality of elements included in series data related to a classification target; a score calculation unit that calculates an integrated score for binary classification of the classification target in each time the acquisition unit acquires the elements; a threshold value determining unit that determines an upper limit threshold value and a lower limit threshold value of the integrated score in each time the acquisition unit acquires the elements; and a class determination unit that determines a determination result of the binary classification as a first class in a case where the integrated score is equal to or more than the upper limit threshold value, determines the determination result as a second class in a case where the integrated score is equal to or less than the lower limit threshold value, and determines the determination result as class indetermination in a case where the integrated score is less than the upper limit threshold value and more than the lower limit threshold value, on the basis of comparison between the integrated score and the upper limit threshold value and the lower limit threshold value in each time the acquisition unit acquires the elements.

According to a second aspect, there is provided a determination method including sequentially acquiring a plurality of elements included in series data related to a classification target; calculating an integrated score for binary classification of the classification target in each time the elements are acquired; determining an upper limit threshold value and a lower limit threshold value of the integrated score in each time the elements are acquired; and determining a determination result of the binary classification as a first class in a case where the integrated score is equal to or more than the upper limit threshold value, determining the determination result as a second class in a case where the integrated score is equal to or less than the lower limit threshold value, and determining the determination result as class indetermination in a case where the integrated score is less than the upper limit threshold value and more than the lower limit threshold value, on the basis of comparison between the integrated score and the upper limit threshold value and the lower limit threshold value in each time the elements are acquired.

According to a third aspect, there is provided a recording medium recording a program causing a computer to execute sequentially acquiring a plurality of elements included in series data related to a classification target; calculating an integrated score for binary classification of the classification target in each time the elements are acquired; determining an upper limit threshold value and a lower limit threshold value of the integrated score in each time the elements are acquired; and determining a determination result of the binary classification as a first class in a case where the integrated score is equal to or more than the upper limit threshold value, determining the determination result as a second class in a case where the integrated score is equal to or less than the lower limit threshold value, and determining the determination result as class indetermination in a case where the integrated score is less than the upper limit threshold value and more than the lower limit threshold value, on the basis of comparison between the integrated score and the upper limit threshold value and the lower limit threshold value in each time the elements are acquired.

Advantageous Effects

According to the above determination device, determination method, and recording medium, in a case where data is sequentially acquired and determination of class classification is repeated until a predetermined condition regarding the certainty of a class classification result is established, it is possible to dynamically adjust the relationship between the classification accuracy and the time required for classification.

EXAMPLE EMBODIMENTS

Hereinafter, some non-limiting embodiments will be described. Not all combinations of features described in the embodiments are essential.

First Embodiment

Figure 1:
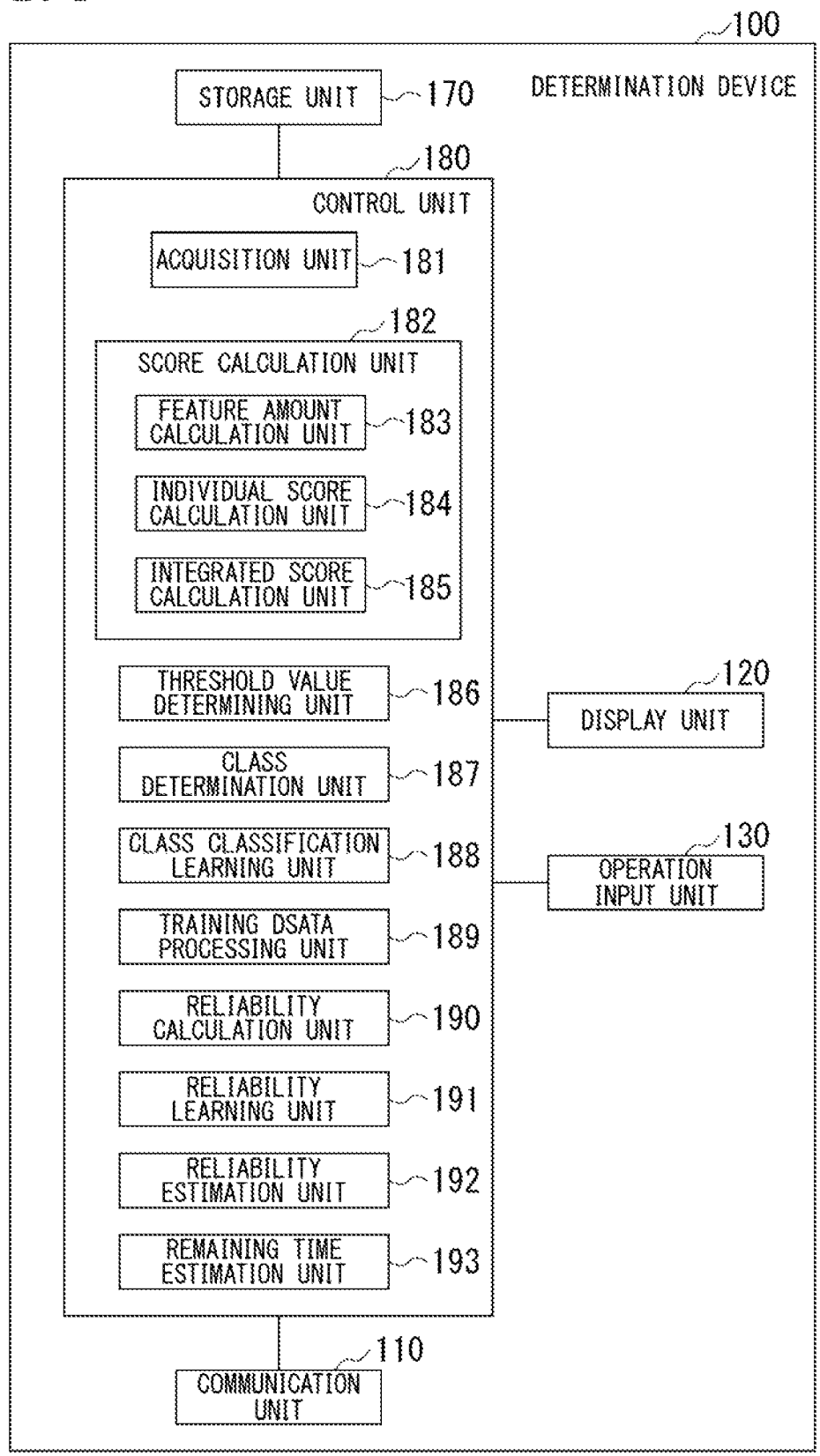
FIG. 1 is a schematic block diagram illustrating a functional configuration of a determination device according to a first embodiment.

FIG. 1 is a schematic block diagram illustrating a functional configuration of a determination device according to a first embodiment. With the configuration illustrated in FIG. 1, a determination device 100 includes a communication unit 110, a display unit 120, an operation input unit 130, a storage unit 170, and a control unit 180. The control unit 180 includes an acquisition unit 181, a score calculation unit 182, a threshold value determining unit 186, a class determination unit 187, a class classification learning unit 188, a training data processing unit 189, a reliability calculation unit 190, a reliability learning unit 191, a reliability evaluation unit 192, and a remaining time estimation unit 193. The score calculation unit 182 includes a feature amount calculation unit 183, an individual score calculation unit 184, and an integrated score calculation unit 185.

The determination device 100 sequentially acquires elements of series data related to a classification target, and performs binary classification on the classification target. The determination device 100 performs determination regarding the classification target through the binary classification. For example, in a case it is determined whether or not a person captured in a moving image is disguised to prevent face authentication, the determination device 100 may classify the moving image that is a classification target into either a disguised class or a non-disguised class. Alternatively, in a case where it is determined whether or not an image that is a classification target is processed, the determination device 100 may classify the image that is a classification target into either a class with processing or a class without processing.

The determination device 100 may be able to select a determination result that it is unclear which class a classification target is classified into. This will also be referred to as class indetermination in which it is unclear which class a classification target is classified into.

The determination device 100 is configured by using a computer such as a personal computer (PC) or a workstation.

The series data referred to here is data including a plurality of elements that can be ordered. The classification target and time-series data handled by the determination device 100 are not limited to specific ones. Various classification targets and series data used for a classification target for each element to be able to undergo binary classification may be targets handled by the determination device 100.

The series data here may be time-series data or non-time-series data. Examples of time-series data include moving image data and audio data. Examples of non-time-series data include vegetation data sampled from a plurality of locations, inspection data at a plurality of locations of a product, and a plurality of pieces of biological data for biological authentication.

In a case where the series data is moving image data, a plurality of elements included in the series data may be frames of moving images. In a case where the series data is inspection data at a plurality of locations of a product, a plurality of elements included in the series data may be inspection data at respective locations of the product. However, the series data and elements that are targets handled by the determination device 100 are not limited to these.

In a case where the series data is inspection data at a plurality of locations of a product, classes in the binary classification by the determination device 100 may be a class indicating that the product is a non-defective product and a class indicating that the product is a defective product. In a case where the series data is a plurality of pieces of biological data for biological authentication, classes in the binary classification by the determination device 100 may be a class indicating that an authentication target person is the same person as a target person and a class indicating that the authentication target person is not the same person as the target person.

The determination device 100 performs, each time an element of series data is acquired, binary classification on the basis of the acquired element. It is expected that the accuracy of the binary classification will be improved with an increase in the number of elements used by the determination device 100 for the binary classification.

The determination device 100 repeatedly performs the binary classification each time an element is acquired until a predetermined end condition is established, and employs a determination result of the binary classification when the end condition is established as a conclusive determination result of the binary classification.

In a case where particular clarification is necessary, a conclusive determination result will be referred to as a final determination result, and determination results other than the final determination result will be referred to as intermediate determination results to distinguish them from the final determination results.

In the following description, a case where the end condition is established when the determination device 100 determines a class to which a determination target belongs out of the two classes as a determination result of the binary classification will be described as an example. Therefore, the determination device 100 determines an intermediate determination result of the binary classification as class indetermination.

Whether or not a final determination result will be class indetermination depends on an end condition. In a case where the determination device 100 only determining a class to which a determination target belongs out of the two classes as a determination result of the binary classification is an end condition, the determination device 100 necessarily determines a class to which the determination target belongs out of the two classes as a final determination result. On the other hand, for example, when an end condition is established other than a case where the determination device 100 determines a class to which a determination target belongs out of the two classes as a determination result of the binary classification, such as "the determination device 100 has performed the binary classification a predetermined number of times or more", the determination device 100 may determine a final determination result as class indetermination. In this case, it may be assumed that a classification target belongs to a third class.

The communication unit 110 performs communication with other devices. For example, in a case where an element of series data is a frame of a moving image, the communication unit 110 may receive an image for each frame as image data from a device that captures the moving image. Alternatively, in a case where the determination device 100 determines the presence or absence of processing of an image, the communication unit 110 may receive an image that is a determination target as image data.

The display unit 120 includes a display screen such as a liquid crystal panel or a light emitting diode (LED), and displays various images. Alternatively, the display unit 120 may include a display device such as a lamp or a seven-segment display to display information in addition to or instead of the display screen.

For example, in a case of displaying an index of the remaining time predicted by output of a final determination result by the determination device 100, the display unit 120 may display the index of the remaining time by using a blinking pattern of a lamp or by displaying numbers on the seven-segment display.

Consequently, the display unit 120 can display the index of the remaining time by using an inexpensive and compact display device such as a lamp or a seven-segment display without using a display screen. For example, even in a case where the display unit 120 does not have a display screen, or the display screen of the display unit 120 is small, the increase in device cost of the determination device 100 for displaying the index of the remaining time and the increase in size of the determination device 100 are small.

In a case where the display unit 120 displays the index of the remaining time by using the seven-segment display, the index of the remaining time may be displayed as a one-digit number. Consequently, the number of seven-segment displays required for displaying the index of the remaining time is only one, and the increase in device cost of the determination device 100 and the increase in size of the determination device 100 are small.

The display unit 120 will also be referred to as a remaining time display unit.

The operation input unit 130 includes input devices such as a keyboard and a mouse, and receives user operations. For example, the operation input unit 130 may receive a parameter value setting operation for the binary classification by the determination device 100.

The storage unit 170 stores various pieces of data. The storage unit 170 is configured by using a storage device included in the determination device 100.

The control unit 180 controls each unit of the determination device 100 to perform various processes. Functions of the control unit 180 are executed, for example, by a central processing unit (CPU) included in the determination device 100 reading a program from the storage unit 170 and executing the program. Some or all of the functions of the control unit 180 may be executed by using dedicated hardware for the functions of the control unit 180, for example, by using a field programmable gate array (FPGA).

The acquisition unit 181 sequentially acquires a plurality of elements included in series data related to a classification target.

For example, in a case where the determination device 100 determines whether or not a person captured in a moving image is disguised to prevent face authentication, the communication unit 110 may receive an image for each frame of the moving image as image data, and the acquisition unit 181 may acquire the image for each frame as the image data from the data received by the communication unit 110. In this case, each of the images for respective frames corresponds to an example of an element included in series data.

Alternatively, in a case where the determination device 100 determines whether or not an image has been processed, the communication unit 110 may receive an image that is a determination target as image data, and the acquisition unit 181 may acquire a plurality of partial images of the image that is a determination target as image data. In this case, each of the partial images corresponds to an example of an element included in series data.

The score calculation unit 182 calculates an integrated score for performing the binary classification on a classification target each time the acquisition unit 181 acquires an element of series data. The integrated score referred to here is a score for the binary classification, calculated on the basis of all the series data or all elements acquired by the determination device 100 in the series data. The integrated score calculated by the score calculation unit 182 is not limited to a specific type of score. Any of various scores comparable to upper and lower limit threshold values may be used as the integrated score.

The feature amount calculation unit 183 calculates a feature amount of each element of series data. For example, in a case where the acquisition unit 181 acquires an image such as a frame of a moving image or a partial image of an image that is a determination target as an element of series data, the feature amount calculation unit 183 extracts the feature amount of the image that is the element of the series data.

The feature amount calculation unit 183 may calculate a feature amount by using a neural network such as a convolutional neural network (CNN). However, a method in which the feature amount calculation unit 183 calculates a feature amount of the element is not limited to a specific method.

The individual score calculation unit 184 calculates an individual score for each element and each class on the basis of the feature amount of the element of the series data. The individual score referred to here is a score indicating evaluation of classifying a classification target into the class on the basis of an element recently acquired by the acquisition unit 181.

The individual score calculation unit 184 may calculate an individual score in consideration of a relevance between an element recently acquired by the acquisition unit 181 and an element acquired in the past, in addition to the element acquired recently by the acquisition unit 181.

The individual score calculation unit 184 may calculate an individual score based on a likelihood ratio. N elements (where N is a positive integer) forming series data are expressed as $x^{(1)}, x^{(2)}, \ldots,$ and $x^{(t)}$, and the two classes in the binary classification are expressed as $C_0$ and $C_1$. The numbers $(1, 2, \ldots,$ and $t)$ in parentheses shown to the upper right of the element $x^{(i)}$ indicate the order in which the acquisition unit 181 acquires the elements.

The class is indicated by a value of the label y. y=0 indicates the class $C_0$. Alternatively, y=0 indicates that a classification target belongs to the class $C_0$. y=1 indicates the class $C_1$. Alternatively, y=1 indicates that a classification target belongs to the class $C_1$.

The class $C_1$ will also be referred to as a first class. The class $C_2$ will also be referred to as a second class.

The probability that the element $x^{(i)}$ (where i is a positive integer) belongs to the class $C_0$ is expressed as $p(x^{(i)}|y=0)$. The probability that the element $x^{(i)}$ belongs to the class $C_1$ is expressed as $p(x^{(i)}|y=1)$. The probability referred to here that the element $x^{(i)}$ belongs to the class $C_0$ is the probability that a classification target belongs to the class $C_0$, which is calculated on the basis of the element $x^{(i)}$. The probability that the element $x^{(i)}$ belongs to the class $C_1$ is the probability that a classification target belongs to the class $C_1$, which is calculated on the basis of the element $x^{(i)}$.

A likelihood ratio between the probability $p(x^{(i)}|y=0)$ that the element $x^{(i)}$ belongs to the class $C_0$ and the probability $p(x^{(i)}|y=1)$ that the element $x^{(i)}$ belongs to the class $C_1$ may be expressed as in the formula (1).

[Math. 1]

$$\frac{p(x^{(i)}|y=1)}{p(x^{(i)}|y=0)} \tag{1}$$

In a case where the likelihood ratio represented by the formula (1) is more than 1, that is, $p(x^{(i)}|y=1)>p(x^{(i)}|y=0)$, and thus the element $x^{(i)}$ is more appropriately classified into the class $C_1$ than the class $C_0$. As described above, the likelihood ratio represented by the formula (1) functions as an index indicating whether it is appropriate for the element $x^{(i)}$ to belong to the class $C_0$ or the class $C_1$.

In a case based on two elements $x^{(i)}$ and $x^{(i-1)}$, a likelihood ratio between the probability that a classification target belongs to the class $C_0$ and the probability that the classification target belongs to the class $C_1$ may be expressed as in the formula (2).

[Math. 2]

$$\frac{p(x^{(i)}, x^{(i-1)}|y=1)}{p(x^{(i)}, x^{(i-1)}|y=0)} \tag{2}$$

The individual score calculation unit 184 may calculate either one of the likelihood ratios represented by the formula (1) and the likelihood ratio represented by the formula (2), or a combination thereof as an individual score. However, an individual score calculated by the individual score calculation unit 184 is not limited to this. For example, the individual score calculation unit 184 may calculate a log-likelihood ratio as an individual score. The log-likelihood ratio is a logarithm of a likelihood ratio.

The individual score calculation unit 184 may calculate the individual score by using a neural network such as a long short term memory (LSTM). However, a method in which the individual score calculation unit 184 calculates an individual score is not limited to a specific method.

The individual score calculation unit 184 may be configured as one functional unit having the functions of the feature amount calculation unit 183, and may calculate an individual score as a feature amount of an element of series data.

The integrated score calculation unit 185 calculates an integrated score on the basis of individual scores. As described above, the integrated score is a score for the binary classification, calculated on the basis of all the series data or all elements acquired by the determination device 100 in the series data.

The integrated score calculation unit 185 may update an integrated score on the basis of an individual score recently calculated by the individual score calculation unit 184 and an integrated score calculated in the past by the integrated score calculation unit 185. For example, the integrated score calculation unit 185 may calculate an integrated score based on the elements $x^{(1)}, x^{(2)}, \ldots,$ and $x^{(i)}$ by using an individual score based on the element $x^{(i)}$ calculated by the individual score calculation unit 184 and an integrated score based on the elements $x^{(1)}, x^{(2)}, \ldots,$ and $x^{(i-1)}$ calculated by the integrated score calculation unit 185.

The integrated score calculation unit 185 may calculate a likelihood ratio represented by the formula (3) as an integrated score on the basis of the t elements $x^{(1)}, x^{(2)}, \ldots,$ and $x^{(t)}$.

[Math. 3]

$$\frac{p(x^{(1)}, x^{(2)}, \ldots, x^{(t)}|y=1)}{p(x^{(1)}, x^{(2)}, \ldots, x^{(t)}|y=0)} \tag{3}$$

$p(x^{(1)}, x^{(2)}, \ldots, x^{(t)}|y=0)$ indicates a probability that a classification target belongs to the class $C_0$ in a case based on the elements $x^{(1)}, x^{(2)}, \ldots,$ and $x^{(t)}$.

$p(x^{(1)}, x^{(2)}, \ldots, x^{(t)}|y=1)$ indicates a probability that a classification target belongs to the class $C_1$ in a case based on the elements $x^{(1)}, x^{(2)}, \ldots,$ and $x^{(t)}$. "$p^{(1)}, x^{(2)}>x^{(t)}|y=1)/p(x^{(1)}, x^{(2)}, \ldots, x^{(t)}|y=0)$" indicates a likelihood ratio of all the series data based on the elements $x^{(1)}, x^{(2)}, \ldots,$ and $x^{(t)}$.

Alternatively, the integrated score calculation unit 185 may calculate a log-likelihood ratio obtained by taking a logarithm of the likelihood ratio represented by the formula (3) as an integrated score.

In a case where each element of series data can be regarded to be independent, a likelihood ratio of all the series data can be decomposed into a term of the likelihood ratio for each element. For example, in a case where a log-likelihood ratio is used for an integrated score, a log-likelihood ratio "$\log[p(x^{(1)}, x^{(2)} \ldots, x^{(t)}|y=1)/p(x^{(1)}, x^{(2)}, \ldots x^{(t)}|y=0)]$" of all the series data based on the elements $x^{(1)}, x^{(2)}, \ldots,$ and $x^{(t)}$ can be calculated according to the formula (4).

[Math. 4]

$$\left(\frac{p(x^{(1)}, x^{(2)}, \ldots, x^{(t)}|y=1)}{p(x^{(1)}, x^{(2)}, \ldots, x^{(t)}|y=0)}\right) = \sum_{i=1}^{t} \log\left(\frac{p(y=1|x^{(i)})}{p(y=0|x^{(i)})}\right) \quad (4)$$

In the formula (4), a base value of the logarithm may be any constant value as long as the base is unified in the entire expression. For example, any of 2, Napier numbers (e), and 10 may be used as the base of the logarithm of the formula (4). The same applies to the following expressions.

On the other hand, in a case where each element of series data is not independent, it is preferable to consider a relevance between elements in order to calculate a likelihood ratio with higher accuracy.

For example, in a case of considering a relevance of elements from the element $x^{(i)}$ to the element $x^{(i-n)}$ n elements before, a log-likelihood ratio may be calculated on the basis of the formula (5).

[Math. 5]

$$\log\left(\frac{p(x^{(1)}, x^{(2)}, \ldots, x^{(t)}|y=1)}{p(x^{(1)}, x^{(2)}, \ldots, x^{(t)}|y=0)}\right) = \sum_{i=n+1}^{t} \log\left(\frac{p(y=1|x^{(i)}, \ldots, x^{(i-n)})}{p(y=0|x^{(i)}, \ldots, x^{(i-n)})}\right) - \sum_{i=n+2}^{t} \log\left(\frac{p(y=1|x^{(i-1)}, \ldots, x^{(i-n)})}{p(y=0|x^{(i-1)}, \ldots, x^{(i-n)})}\right) - \log\left(\frac{p(y=1)}{p(y=0)}\right) \quad (5)$$

The third term "$-\log(p(y=1)/p(y=0))$" on the right side is a constant term representing a bias. The value of the third term on the right side may be set to 0.

For example, in a case of considering a relevance between the element $x^{(i)}$ and the previous element $x^{(i-1)}$, a log-likelihood ratio may be calculated on the basis of the formula (6) obtained by defining n as 1 in the formula (5).

[Math. 6]

$$\log\left(\frac{p(x^{(1)}, x^{(2)}, \ldots, x^{(t)}|y=1)}{p(x^{(1)}, x^{(2)}, \ldots, x^{(t)}|y=0)}\right) = \quad (6)$$

-continued $$\sum_{i=2}^{t} \log\left(\frac{p(y=1|x^{(i)}, x^{(i-1)})}{p(y=0|x^{(i)}, x^{(i-1)})}\right) - \sum_{i=3}^{t} \log\left(\frac{p(y=1|x^{(i-1)})}{p(y=0|x^{(i-1)})}\right) - \log\left(\frac{p(y=1)}{p(y=0)}\right)$$

In a case where the acquisition unit 181 acquires t elements $x^{(1)}, x^{(2)}, \ldots,$ and $x^{(t)}$, the integrated score calculation unit 185 may calculate, as an integrated score, the likelihood ratio represented by the formula (3) or the log-likelihood ratio based on any of the formulae (4) to (6).

However, as described above, an integrated score calculated by the score calculation unit 182 is not limited to a specific type of score. The function of the feature amount calculation unit 183, the function of the individual score calculation unit 184, and the function of the integrated score calculation unit 185 may not be explicitly separated.

The threshold value determining unit 186 determines an upper limit threshold value and a lower limit threshold value of an integrated score each time the acquisition unit 181 acquires an element of series data.

By comparing the integrated score with the upper and lower limit threshold values of the integrated score, it is possible to determine whether a classification target belongs to the class $C_0$ or the class $C_1$, or a class is undetermined at the present time.

Figure 2:
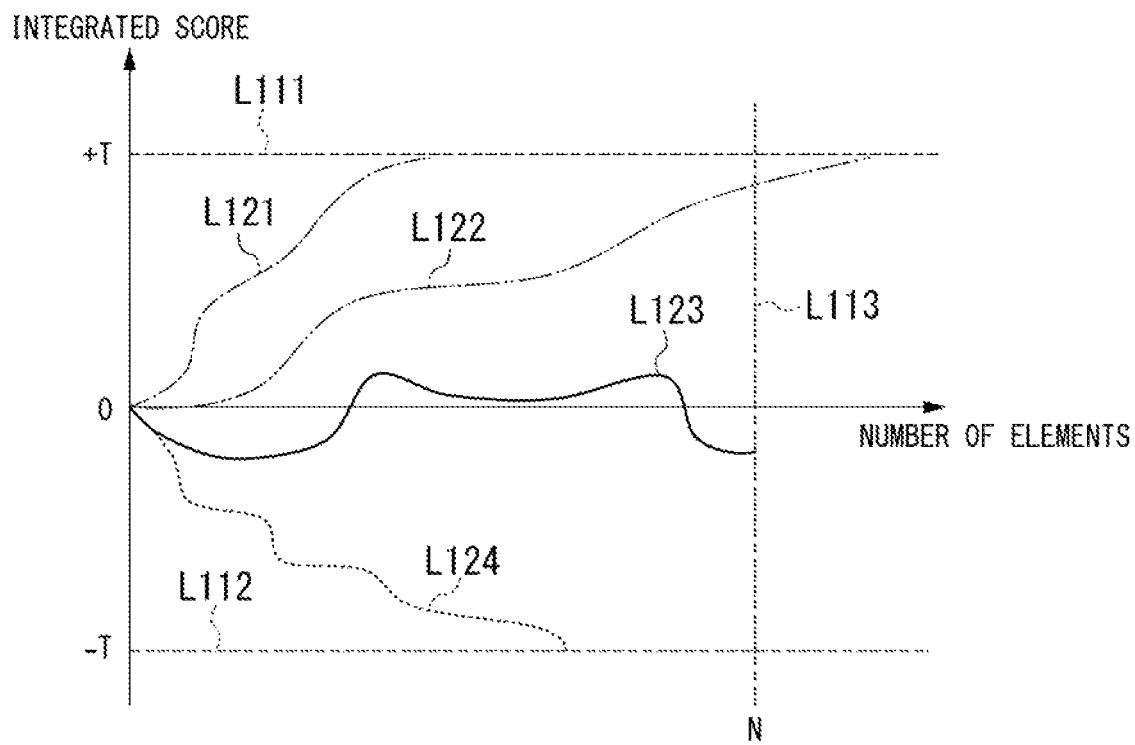
FIG. 2 is a diagram illustrating a first example of a threshold value of an integrated score according to the first embodiment.

FIG. 2 is a diagram illustrating a first example of a threshold value of an integrated score. FIG. 2 illustrates an example in which a threshold value of an integrated score is set to a constant value. In a case where a threshold value of an integrated score is set to a constant value, the determination device 100 does not have to include the threshold value determining unit 186.

The horizontal axis of the graph in FIG. 2 represents the number of elements acquired by the acquisition unit 181. The vertical axis represents an integrated score. The number of elements is also called the number of elements.

A line L111 indicates an upper limit threshold value of the integrated score. The upper limit threshold value is set to +T (where T is a positive real number). A line L112 indicates a lower limit threshold value of the integrated score. The lower limit threshold value is set to −T.

A line L113 indicates an example of the maximum value of the number of elements. In the example in FIG. 2, the number of elements that can be acquired by the acquisition unit 181 from one piece of series data is limited to N at the maximum.

FIG. 2 illustrates an example of a case where an index of which a value is 0 when a likelihood of a classification target belonging to the class $C_0$ and a likelihood thereof belonging to the class $C_1$ are equal is used as an integrated score, for example, in a case where a log-likelihood ratio is used as an integrated score.

Lines L121 to L124 each indicates an example of transition in the integrated score.

In the case of the line L121, the integrated score has reached the upper limit threshold value before the number of elements has reached N. In this case, the determination device 100 determines that a classification target belongs to the class $C_1$.

In both the case of the line L122 and the case of the line L123, the integrated score has reached neither the upper limit threshold value nor the lower limit threshold value even when the number of elements is N. In this case, the determination device 100 determines that a class is undetermined.

In the case of the line L124, the integrated score has reached the lower limit threshold value before the number of elements has reached N. In this case, the determination device 100 determines that a classification target belongs to the class $C_0$.

As described above, by comparing the integrated score with the upper limit threshold value and the lower limit threshold value, it is possible to determine a determination result of the binary classification of a classification target as either of the two classes or the class indetermination.

Figure 3:
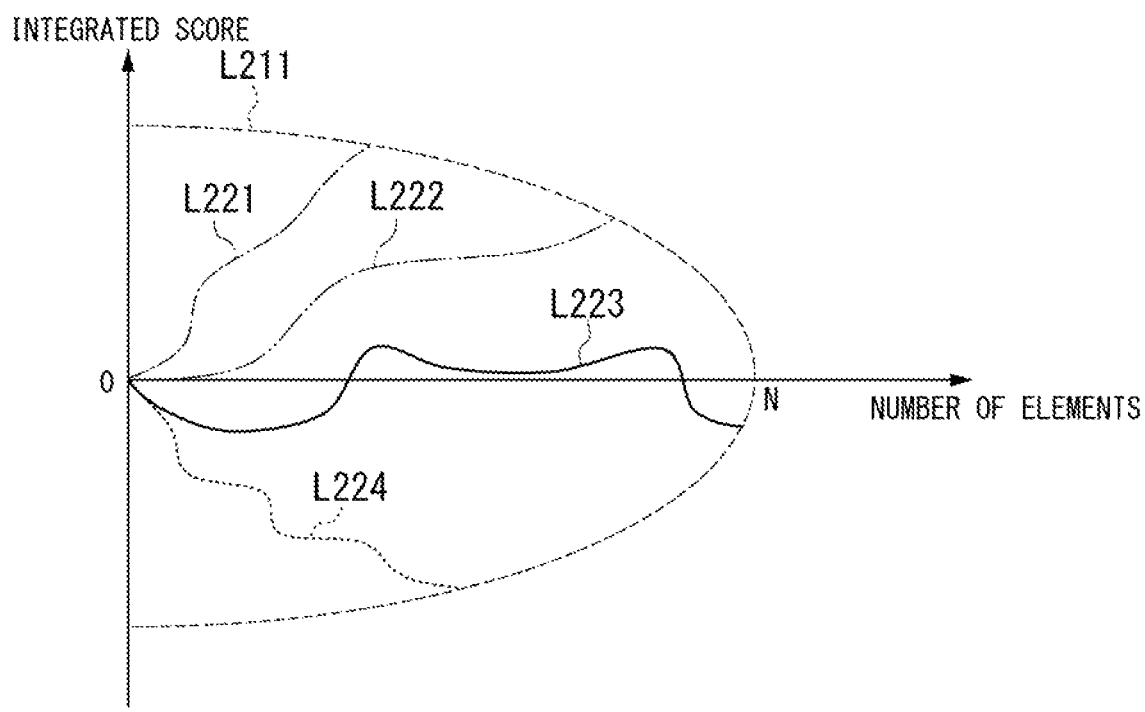
FIG. 3 is a diagram illustrating a second example of a threshold value of an integrated score according to the first embodiment.

FIG. 3 is a diagram illustrating a second example of a threshold value of an integrated score. FIG. 3 illustrates an example of a case where the threshold value determining unit 186 determines an upper limit threshold value and a lower limit threshold value such that the upper limit threshold value of the integrated score monotonically decreases and the lower limit threshold value monotonically increases according to an increase in the number of elements acquired by the acquisition unit 181.

The horizontal axis of the graph in FIG. 3 represents the number of elements acquired by the acquisition unit 181. The vertical axis represents an integrated score.

FIG. 3 illustrates an example of a case where the threshold value determining unit 186 determines the upper limit threshold value and the lower limit threshold value such that the upper limit threshold value and the lower limit threshold value of the integrated score become the same value in a case where a predetermined end condition is established. In the example in FIG. 3, the number of elements that can be acquired by the acquisition unit 181 is limited to N at the maximum, and the number of elements reaching N or the integrated score being either the upper limit threshold value or the lower limit threshold value is the end condition. In a case where the number of elements reaches N, the threshold value determining unit 186 sets both the upper limit threshold value and the lower limit threshold value to 0.

A line L211 indicates the upper and lower limit threshold values of the integrated score. The upper limit threshold value of the integrated score monotonically decreases according to an increase in the number of elements, and becomes 0 when the number of elements is N, which is the end condition. The lower limit threshold value of the integrated score monotonically increases according to an increase in the number of elements, and becomes 0 in a case where the number of elements is N, which is the end condition.

In the same manner as in the case of FIG. 2, FIG. 3 also illustrates an example of a case where an index of which a value is 0 in a case where a likelihood of a classification target belonging to the class $C_0$ and a likelihood belonging to the class $C_1$ are equal is used as the integrated score.

Lines L221 to L224 each indicates an example of transition in the integrated score.

In both the case of the line L221 and the case of the line L222, the integrated score has reached the upper limit threshold value. In this case, the determination device 100 determines that a classification target belongs to the class $C_1$.

On the other hand, in both the case of the line L223 and the case of the line L224, the integrated score has reached the lower limit threshold value. In this case, the determination device 100 determines that a classification target belongs to the class $C_0$.

In the example in FIG. 3, when the number of elements is N, the upper limit threshold value and the lower limit threshold value are the same value, and thus the determination device 100 necessarily classifies a classification target into either of the two classes. That is, in the example in FIG. 3, the determination device 100 does not determine a final determination result of the binary classification as the class indetermination.

When the example of the line L221 is compared with the example of the line L222, the integrated score reaches the upper limit threshold value in the case of the line L221 faster than in the case of the line L222. The case of the line L221 is faster than the case of the line L222, and the determination device 100 may determine that a classification target belongs to the class $C_1$ as a final determination result.

The integrated score when reaching the upper limit threshold value is more in the case of the example of the line L221 than in the case of the example of the line L222. In this respect, it is considered that the accuracy of the final determination result that the classification target belongs to the class $C_1$ is higher in the case of the example of the line L221 than in the case of the example of the line L222.

As described above, in a case where the threshold value determining unit 186 reduces the upper limit threshold value according to an increase in the number of elements and thus the integrated score increases sharply as in the example of the line L221, a final determination result can be obtained relatively quickly in a state in which a likelihood that a classification target belongs to the class $C_1$ is relatively large. In a case where it takes time to increase the integrated score as in the example of the line L222, the final determination result can be obtained relatively quickly by obtaining the final determination result at a stage where the integrated score is relatively small, and it is possible to reduce the possibility of obtaining a final determination result that a class to which a classification target belongs is undetermined.

When the example of the line L223 is compared with the example of the line L224, the integrated score reaches the lower limit threshold value in the case of the line L224 faster than in the case of the line L223. The case of the line L224 is faster than the case of the line L223, and the determination device 100 may determine that a classification target belongs to the class $C_0$ as a final determination result.

The integrated score when reaching the lower limit threshold value is less in the case of the example of the line L224 than in the case of the example of the line L223. In this respect, it is considered that the accuracy of the final determination result that the classification target belongs to the class $C_0$ is higher in the case of the line L224 than in the case of the line L223.

In this way, in a case where the threshold value determining unit 186 increases the lower limit threshold value according to an increase in the number of elements and thus the integrated score sharply decreases as in the example of the line L224, a final determination result can be obtained relatively quickly in a state in which a likelihood that a classification target belongs to the class $C_0$ is relatively large. In a case where it takes time to decrease the integrated score as in the example of the line L223, the final determination result can be obtained relatively quickly by obtaining the final determination result at a stage where the integrated score is relatively large, and it is possible to reduce the possibility of obtaining a final determination result that a class is undetermined.

Figure 4:
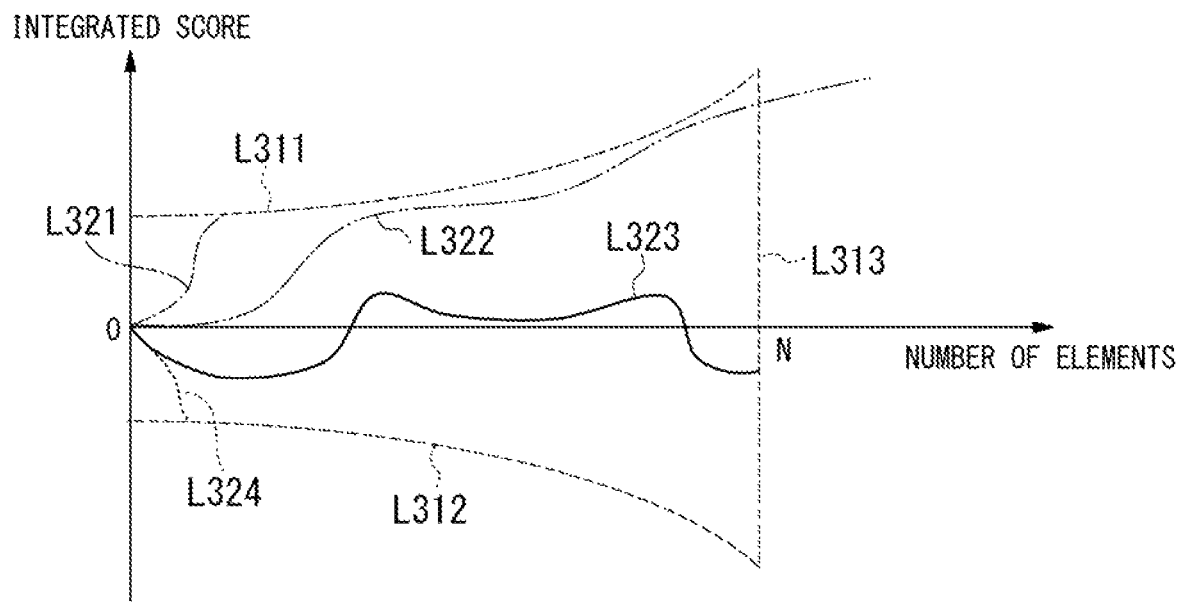
FIG. 4 is a diagram illustrating a third example of a threshold value of an integrated score according to the first embodiment.

FIG. 4 is a diagram illustrating a third example of a threshold value of an integrated score. FIG. 4 illustrates an example of a case where the threshold value determining unit 186 determines an upper limit threshold value and a lower limit threshold value such that the upper limit threshold value of the integrated score monotonically increases and the lower limit threshold value monotonically decreases according to an increase in the number of elements acquired by the acquisition unit 181.

The horizontal axis of the graph in FIG. 4 represents the number of elements acquired by the acquisition unit 181. The vertical axis represents an integrated score.

A line L311 indicates the upper limit threshold value of the integrated score. The upper limit threshold value of the integrated score monotonically increases according to an increase in the number of elements. A line L312 indicates the lower limit threshold value of the integrated score. The lower limit threshold value of the integrated score monotonically decreases according to an increase in the number of elements.

A line L313 indicates an example of the maximum value of the number of elements. In the example in FIG. 4, the number of elements that can be acquired by the acquisition unit 181 is limited to N at the maximum.

In the same manner as in the case of FIG. 2, FIG. 4 also illustrates an example of a case where an index of which a value is 0 when a likelihood of a classification target belonging to the class $C_0$ and a likelihood thereof belonging to the class $C_1$ are equal is used as an integrated score.

Lines L321 to L324 each indicates an example of transition in the integrated score.

In the case of the line L321, the integrated score has reached the upper limit threshold value. In this case, the determination device 100 determines that a classification target belongs to the class $C_1$.

On the other hand, in both the case of the line L322 and the case of the line L323, the integrated score has reached neither the upper limit threshold value nor the lower limit threshold value even when the number of elements is N. In this case, the determination device 100 determines that the class is undetermined.

In the case of the line L324, the integrated score has reached the lower limit threshold value before the number of elements has reached N. In this case, the determination device 100 determines that a classification target belongs to the class $C_0$.

As in the example of FIG. 4, in a case where the threshold value determining unit 186 increases the upper limit threshold value according to an increase in the number of elements and thus the integrated score increases sharply, a final determination result can be obtained relatively quickly. In a case where it takes time to increase the integrated score, it is possible to perform determination more carefully by obtaining a final determination result at a stage where the integrated score is relatively large. For example, in the case of the line L322, the upper limit threshold value increases according to an increase in the number of elements such that the integrated score does not reach the upper limit threshold value, and thus a final determination result that a class is undetermined is obtained.

In a case where the threshold value determining unit 186 reduces the lower limit threshold value according to an increase in the number of elements and thus the integrated score decreases sharply, a final determination result can be obtained relatively quickly. In a case where it takes time to reduce the integrated score, it is possible to perform determination more carefully by obtaining a final determination result at a stage where the integrated score is relatively small.

A user may set in advance an upper limit threshold value and a lower limit threshold value of an integrated score for each number of elements of series data. A representation form of an upper limit threshold value and a lower limit threshold value of an integrated score for each number of elements of series data is not limited to a specific one. For example, an upper limit threshold value and a lower limit threshold value of an integrated score for each number of elements of series data may be represented in the form of a function or may be represented in the form of a table.

Alternatively, the threshold value determining unit 186 may use machine learning such as reinforcement learning or supervised machine learning to acquire a model indicating an upper limit threshold value and a lower limit threshold value of an integrated score for each number of elements of series data.

For example, in a case of reinforcement learning, an agent is assumed to select one of three behaviors such as determining that a classification target belongs to the class $C_0$, determining that a classification target belongs to the class $C_1$, and acquiring the next element without determining a class. A setting is made such that cost increases as the number of elements increases. Learning is performed such that the number of correct answers in the binary classification is maximized.

Consequently, it is expected that the threshold value determining unit 186 will acquire a threshold value for determining the binary classification without acquiring the next element in a case where a determination result of the binary classification does not change even if the number of elements is increased.

Alternatively, an upper limit threshold value and a lower limit threshold value of an integrated score for each number of elements of series data may be determined according to a statistical method. For example, points at which results of the binary classification do not change may be obtained for each example of transition in the integrated score, and the obtained points may be approximated by a curve to obtain the upper limit threshold value and the lower limit threshold value.

Each time the acquisition unit 181 acquires an element of statistical data, the class determination unit 187 determines a determination result of the binary classification of a classification target as either of the two classes or the class indetermination on the basis of comparison between an integrated score and an upper limit threshold value and a lower limit threshold value of the integrated score.

Specifically, in a case where it is determined that the integrated score is more than the upper limit threshold value, the class determination unit 187 determines that a classification target belongs to the class $C_1$ as a determination result. In a case where it is determined that the integrated score is less than the lower limit threshold value, the class determination unit 187 determines that a classification target belongs to the class $C_0$ as a determination result.

On the other hand, in a case where it is determined that the integrated score is equal to or less than the upper limit threshold value and equal to or more than the lower limit threshold value, the class determination unit 187 performs classification depending on whether or not the end condition is established. In a case where it is determined that the end condition is not established, the class determination unit 187 determines that a class to which a classification target belongs is unclear at the present time, and determines to further acquire an element of series data. On the other hand, in a case where it is determined that the end condition is established, the class determination unit 187 determines that a class is undetermined as a final determination result.

The class classification learning unit 188 learns calculation of an integrated score by the score calculation unit 182. At the time of learning, the class classification learning unit 188 uses training data in which series data is associated with either of the two classes or the class indetermination as a correct answer to the binary classification. The class classification learning unit 188 performs learning such that an integrated score has a value between an upper limit threshold value and a lower limit threshold value for series data associated with the class indetermination among pieces of series data included in the training data.

For example, the class classification learning unit 188 performs the learning by using a loss function that provides high evaluation in a case where an integrated score has a value between an upper limit threshold value and a lower limit threshold value for series data associated with the class indetermination among pieces of series data included in the training data.

The class classification learning unit 188 may perform learning by using a loss function represented by the formula (7).

[Math. 7]

$$\text{LOSS} = \lambda_0 \left( \frac{1}{N_{H_0}} \sum_{i \in I_{H_0}} f_0 \right) + \lambda_1 \left( \frac{1}{N_{H_1}} \sum_{i \in I_{H_1}} f_1 \right) + \lambda_B \left( \frac{1}{N_{H_B}} \sum_{i \in I_{H_B}} f_B \right) \quad (7)$$

$\lambda_0$, $\lambda_1$, and $\lambda_B$ are respectively weighting coefficients of real number constants.

$H_0$ indicates a hypothesis that a classification target belongs to the class $C_0$. $H_1$ indicates a hypothesis that a classification target belongs to the class $C_1$. $H_B$ indicates a hypothesis that a class is undetermined.

$I_{H0}$ indicates a set of series data in which a classification target is regarded to belong to the class $C_0$ on the basis of a correct answer of the training data. The series data is identified by the index i. $I_{H1}$ indicates a set of series data in which a classification target is regarded to belong to the class $C_1$ on the basis of a correct answer of the training data. $I_{HB}$ indicates a set of series data in which a class is undetermined on the basis of the correct answer of the training data.

$N_{H0}$ indicates the number of pieces of series data in which a classification target is regarded to belong to the class $C_0$ on the basis of a correct answer of the training data. That is, $N_{H0}$ indicates the number of elements in the set $I_{N0}$. $N_{H1}$ indicates the number of pieces of series data in which a classification target is regarded to belong to the class $C_1$ on the basis of the correct answer of the training data. That is, $N_{H1}$ indicates the number of elements in the set $I_{N1}$. $N_{HB}$ indicates the number of pieces of series data in which a class is regarded to be undetermined on the basis of the correct answer of the training data. That is, $N_{HB}$ indicates the number of elements of the set $I_{NB}$.

$f_0$, $f_1$, and $f_B$ are respective functions of which values are small in a case where an output of a learning model shows a correct answer in a case where the series data shown in the training data is used.

The function $f_0$ may be defined as in the formula (8) but is not limited to this.

[Math. 8]

$$f_0 = \begin{cases} 1 & (\text{SCORE} \leq T_L) \\ 0 & (\text{SCORE} > T_L) \end{cases} \quad (8)$$

SCORE indicates an integrated score. $T_L$ indicates a lower limit threshold value of the integrated score. The function $f_0$ of the formula (8) outputs "1" in a case where the integrated score SCORE is equal to or less than the lower limit threshold value $T_L$, that is, in a case where it is determined that a classification target belongs to the class $C_0$. In other cases, the function $f_0$ outputs "0".

The function $f_1$ may be defined as in the formula (9), but is not limited to this.

[Math. 9]

$$f_1 = \begin{cases} 1 & (\text{SCORE} \geq T_U) \\ 0 & (\text{SCORE} < T_U) \end{cases} \quad (9)$$

$T_U$ indicates an upper limit threshold value of the integrated score. The function $f_1$ of the formula (9) outputs "1" in a case where the integrated score SCORE is equal to or more than the upper limit threshold value $T_U$, that is, in a case where it is determined that a classification target belongs to the class $C_1$. In other cases, the function $f_1$ outputs "0".

The function $f_B$ may be defined as in the formula (10), but is not limited to this.

[Math. 10]

$$f_B = \begin{cases} 1 & (T_L < \text{SCORE} < T_U) \\ 0 & (\text{SCORE} \leq T_L, \text{SCORE} > T_U) \end{cases} \quad (10)$$

The function $f_1$ of the formula (10) outputs "1" in a case where the integrated score SCORE is equal to or less than the upper limit threshold value $T_U$ and equal to or more than the lower limit threshold value $T_L$, that is, in a case where it is determined that a class is undetermined. In other cases, the function $f_B$ outputs "0".

Here, a case is considered in which learning is performed to calculate an integrated score by using training data in which either of the two classes is shown as a correct answer to the binary classification and the class indetermination is not shown. In this case, it is considered that the score calculation unit 182 greatly changes an integrated score such that the integrated score approaches either an upper limit threshold value or a lower limit threshold value for all elements.

On the other hand, as described above, the class classification learning unit 188 may learn to calculate an integrated score by using training data including series data in which the class indetermination is shown as a correct answer to the binary classification. The class classification learning unit 188 may perform learning such that an integrated score has a value between an upper limit threshold value and a lower limit threshold value for series data in which the class indetermination is shown.

Consequently, the score calculation unit 182 is expected to calculate a value between the upper limit threshold value and the lower limit threshold value for an element for which the class indetermination is appropriate. Therefore, the determination device 100 is expected to wait for input of the next element without greatly changing the integrated score for an element for which it is unclear which of the two classes a classification target belongs to.

The class classification learning unit 188 may use a loss function that refers to a function for calculating a loss in a case where a classification target belongs to the class $C_0$ and in a case where a classification target belongs to the class $C_1$ on the basis of a correct answer of training data. For example, the class classification learning unit 188 may use the loss function represented by the formula (11).

[Math. 11]

$$LOSS = LOSS_{0,1} + \lambda_B \left( \frac{1}{N_{H_B}} \sum_{i \in I_{H_B}} f_B \right) \quad (11)$$

The functions $LOSS_{0,1}$ is a function for calculating a loss in a case where a classification target belongs to the class $C_0$ and in a case where a classification target belongs to the class $C_1$ on the basis of a correct answer of the training data. The function $LOSS_{0,1}$ is represented by, for example, by the formula (12).

[Math. 12]

$$LOSS_{0,1} = \lambda_0 \left( \frac{1}{N_{H_0}} \sum_{i \in I_{H_0}} f_0 \right) + \lambda_1 \left( \frac{1}{N_{H_1}} \sum_{i \in I_{H_1}} f_1 \right) \quad (12)$$

However, the function $LOSS_{0,1}$ is not limited to one represented by the formula (12). For example, a well-known loss function in the binary classification may be used as the function $LOSS_{0,1}$. Consequently, a well-known method may be used for determining whether a classification target belongs to the class $C_0$ or the class $C_1$.

The training data processing unit 189 adds information regarding the class indetermination to information regarding a correct answer of training data. Specifically, the training data processing unit 189 acquires training data in which series data is associated with either of the two classes as a correct answer to the binary classification. That is, the training data processing unit 189 acquires the training data in which information regarding the class indetermination is not shown.

In a case where a classification result of performing the binary classification on the acquired training data by using a predetermined classifier is different from a correct answer, the training data processing unit 189 associates the series data thereof with information indicating the class indetermination as a correct answer to the binary classification.

For example, for series data in which a result of binary classification using a classifier is different from the correct answer, the training data processing unit 189 may add information indicating the class indetermination while leaving information indicating either of the two classes as the correct answer to the binary classification.

Alternatively, the information indicating the class indetermination may be manually added for the training data in which the information indicating the class indetermination is not shown. In this case, the determination device 100 does not have to include the training data processing unit 189.

The reliability calculation unit 190 calculates an index value of the reliability of an integrated score on the basis of history information of the integrated score or a feature amount of an element used for calculating the integrated score.

The reliability of the integrated score referred to is the degree of a probability that, in a case where it is determined which of the two classes a classification target belongs to on the basis of an integrated score, the classification target may actually belong to that class.

The display unit 120 may display the index value of the reliability of the integrated score.

For example, a case is considered in which the determination device 100 is configured as an authentication system that sequentially acquires moving images as frame image data and performs face authentication each time the frame image data is acquired. In this case, the index value of the reliability of the integrated score may be used as an index value indicating the reliability of an authentication result. In a case where the reliability of the integrated score is low, a person in charge of using the authentication system pays special attention to whether there is any suspicious point in an authentication target person, and in a case where the authentication system performs incorrect authentication, the person in charge is more likely to be aware of the incorrect authentication.

Alternatively, in a case where the determination device 100 as the authentication system succeeds in authentication and the reliability of the integrated score is low, the display unit 120 may display a message prompting the authentication target person to receive the confirmation of the person in charge.

In a case where a plurality of collation target persons of face authentication are registered, the score calculation unit 182 may calculate an integrated score for binary classification into a class in which an authentication target person is the same as any of the collation target persons and a class in which the authentication target person is different from all of the collation target persons. The reliability calculation unit 190 may calculate an index of the reliability of the integrated score, and the display unit 120 may display this index.

Alternatively, the score calculation unit 182 may calculate an integrated score for binary classification into, for each collation target person, a class in which an authentication target person is the same as the collation target person and a class in which the authentication target person is different from the collation target person.

In this case, the reliability calculation unit 190 may calculate an index value of the reliability of the integrated score for each collation target person, and the display unit 120 may display the index value of the reliability of the integrated score for each collation target person. Alternatively, the reliability calculation unit 190 may calculate one index value of the reliability for a plurality of integrated scores, such as calculating an index value of the reliability of an integrated score having the highest reliability among the plurality of integrated scores. The display unit 120 may calculate the index value of the reliability.

The reliability calculation unit 190 may calculate an index value of the reliability of the integrated score even before the end condition for the binary classification is established. In a case where the reliability of the integrated score is low at a stage before the end of the binary classification, it is considered that a final determination result of which of the two classes a classification target belongs to cannot be obtained until the end condition is established. Alternatively, even in a case where the final determination result of which of the two classes the classification target belongs to is obtained, there is a relatively high probability that the final determination result is incorrect.

Therefore, in a case where the reliability of the integrated score is low at a stage before the end of the binary classification, the determination device 100 may stop the process of the binary classification. In a case where new series data can be acquired, the determination device 100 may acquire the new series data and perform the process of the binary classification again. In a case where new series data cannot be acquired, the determination device 100 may output an alarm indicating that the process has been interrupted.

Figure 5:
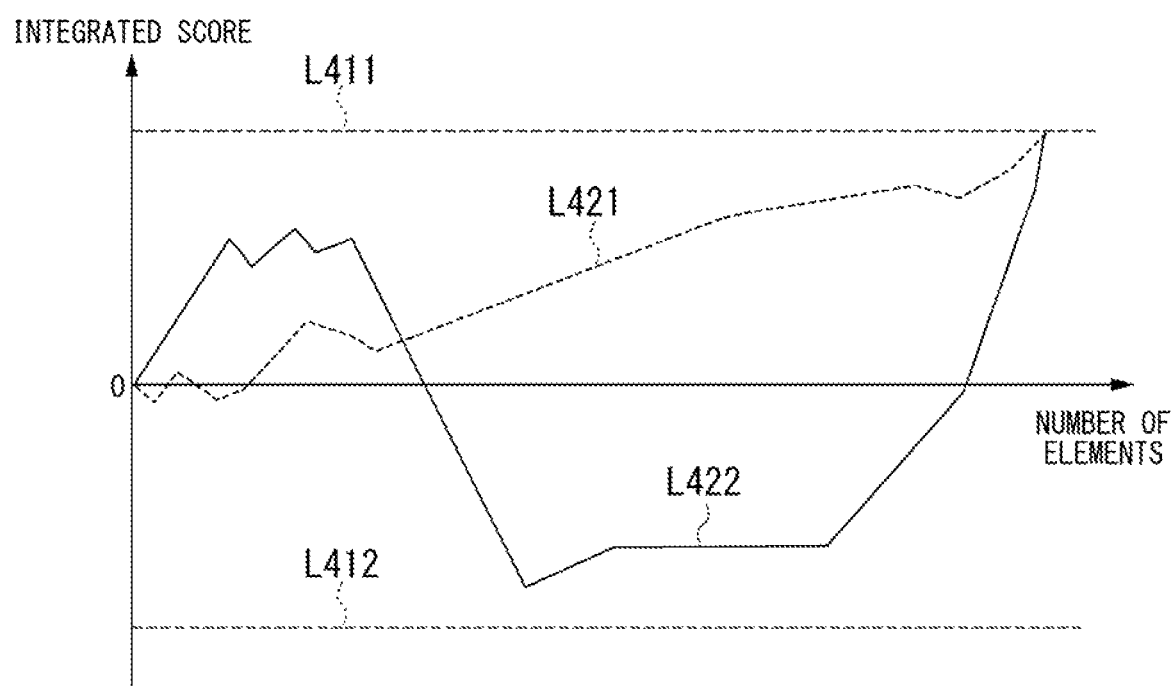
FIG. 5 is a diagram illustrating an example of transition of an integrated score according to the first embodiment.

FIG. 5 is a diagram illustrating an example of transition of an integrated score. The horizontal axis of the graph in FIG. 5 represents the number of elements acquired by the acquisition unit 181. The vertical axis represents an integrated score.

A line L411 indicates an upper limit threshold value of the integrated score. A line L412 indicates a lower limit threshold value of the integrated score.

Lines L421 and L422 show examples of transition of the integrated score according to the number of elements acquired by the acquisition unit 181 respectively.

When the example of the line L421 is compared with the example of L422, the integrated score reaches the upper limit threshold value at the same number of elements.

On the other hand, in the example of the line L421, the integrated score continues to increase approximately, whereas in the example of the line L422, the integrated score greatly increases or decreases.

From this, if the upper limit threshold value of the integrated score is set to a greater value, in the example of the line L421, it is considered to be highly likely that the threshold value will continue to increase until the upper limit threshold value is reached. On the other hand, in the line L422, it is considered that the probability that the integrated score starts to decrease again and reaches the lower limit threshold value before reaching the upper limit threshold value is higher than that in the case of the line L421.

That is, in the example of the line L422, a probability that the integrated score has reached the upper limit threshold value due to an accidental factor such as disturbance is higher than that in the case of the example of the line L421. In the case of the example of the line L421, the probability that a classification target belongs to the class $C_1$ is considered to be higher than in the case of the example of the line L421 with respect to a final determination result that the classification target belongs to the class $C_1$ due to the integrated score having reached the upper limit threshold value.

Therefore, an index value that provides higher reliability of the integrated score may be used in a case where the integrated score continues to change with a substantially constant amount of change as in the example of the line L421 than in a case where the integrated score changes with a large amount of change as in the example of the line L422.

An example of an index value indicating the amount change in the integrated score is an index value indicating a magnitude of variation in the integrated score, such as a variance or a standard deviation of the integrated score. It is considered that the larger the variation in the integrated score, the larger the positive and negative fluctuations in the integrated score, and the lower the reliability of a result of the binary classification based on the integrated score.

The reliability calculation unit 190 may use, as an index value of the reliability of the integrated score, an index value such as a variance or a standard deviation of the integrated score which has a greater value as a variation of the integrated score increases. In this case, as the index value becomes smaller, the reliability of the integrated score becomes higher.

Alternatively, the reliability calculation unit 190 may calculate an index value such as a reciprocal of a variance of the integrated score or a reciprocal of a standard deviation of the integrated score which has a smaller value as a variation of the integrated score increases. In this case, as the index value becomes greater, the reliability of the integrated score becomes higher.

In a case of using a pre-formulated calculation method such as a variance or a standard deviation of the integrated score or a reciprocal thereof as a reliability calculation method, it is not necessary to learn a reliability calculation method. In this case, the determination device 100 does not have to include the reliability learning unit 191.

Transition in the integrated score illustrated in FIG. 5 is indicated by history information of the integrated score. An index values such as a variance or a standard deviation of the integrated score, or a reciprocal thereof corresponds to an example of an index value of the reliability of the integrated score based on the history information of the integrated score.

The reliability learning unit 191 learns to calculate the reliability of the binary classification of a classification target. For example, the reliability learning unit 191 learns to calculate an index value of the reliability such that, among scores of respective classes, a score of a class corresponding to a correct answer is calculated as an index value of the reliability of each element of series data, by using training data in which the series data is associated with correct answer information regarding which of the two classes a classification target belongs to in a case of the series data.

Figure 6:
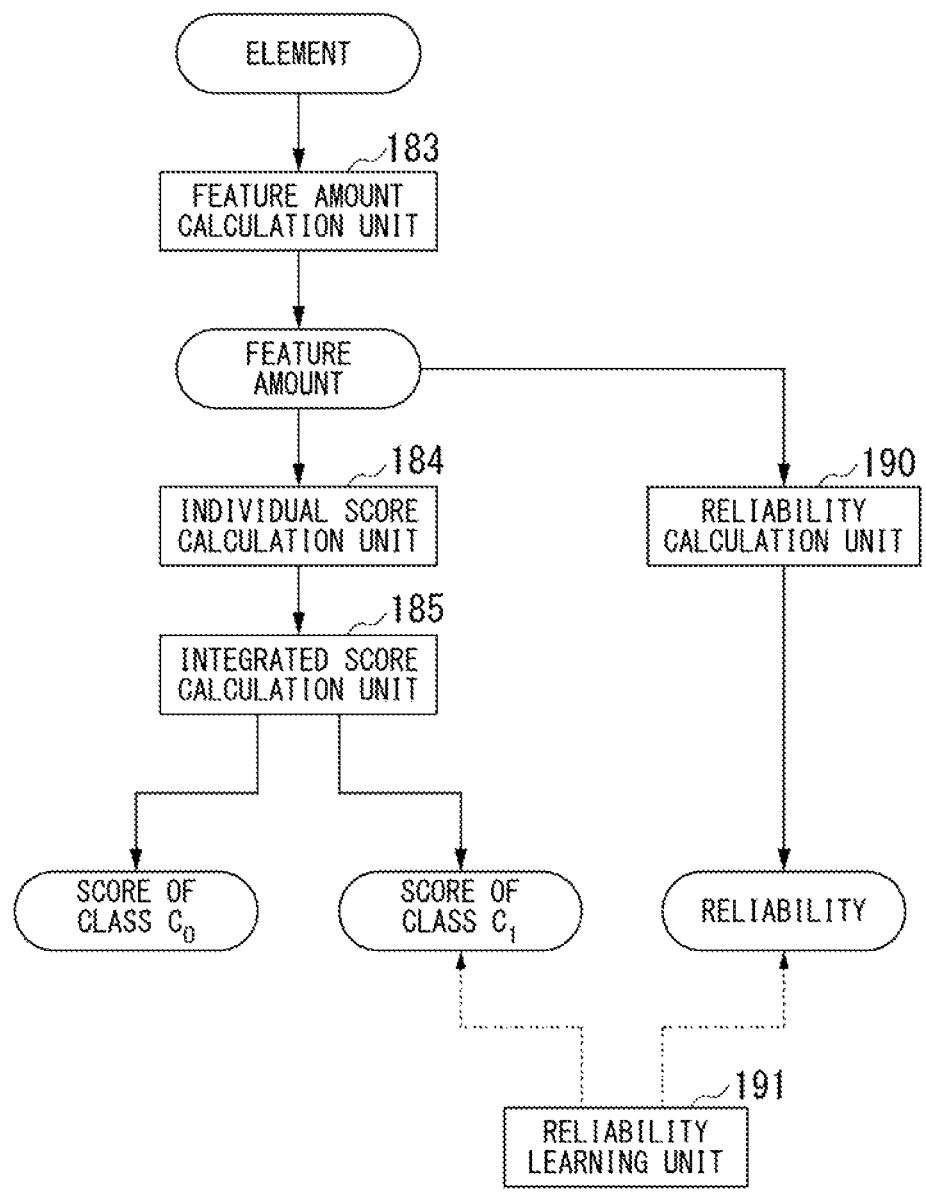
FIG. 6 is a diagram illustrating an example of learning of a reliability calculation method by a reliability learning unit according to the first embodiment.

FIG. 6 is a diagram illustrating an example of learning a reliability calculation method by the reliability learning unit 191.

In the example in FIG. 6, the feature amount calculation unit 183 calculates a feature amount of each element of series data each time the acquisition unit 181 acquires the element. The individual score calculation unit 184 calculates an individual score by using the feature amount calculated by the feature amount calculation unit 183 each time the acquisition unit 181 acquires the element of the series data.

The integrated score calculation unit 185 calculates an integrated score by using the individual score calculated by the individual score calculation unit 184 each time the acquisition unit 181 acquires the element of the series data. The integrated score calculation unit 185 calculates a score of each class each time the acquisition unit 181 acquires the element of the series data. Specifically, the integrated score calculation unit 185 calculates a score of the class $C_0$ and a score of the class $C_1$.

The integrated score calculation unit 185 calculates a score correlated with the integrated score as a score of each class. The integrated score calculation unit 185 may calculate a score correlated with the integrated score by calculating the integrated score and the score of each class on the basis of the feature amount.

The integrated score calculation unit 185 may calculate a score of each class based on the integrated score.

For example, in a case where the integrated score calculation unit 185 calculates the log-likelihood ratio "$\log(p(x^{(1)}, x^{(2)}, x^{(t)}|y=1)/p(x^{(1)}, x^{(2)}, \ldots, x^{(t)}|y=0))$" shown on the left side of the above the formulae (4) to (6) as the integrated score, this integrated score may be used as a score of the class $C_1$, and a value obtained by subtracting the integrated score from 0, that is, "$-\log(p(x^{(1)}, x^{(2)}, x^{(t)}|y=1)/p(x^{(1)},x^{(2)}, \ldots x^{(t)}|y=0))$" may be calculated as a score of the class $C_0$.

In this case, when the score of the class $C_1$ is more than 0, the score of the class $C_0$ is less than 0. On the other hand, when the score of the class $C_1$ is less than 0, the score of the class $C_0$ is more than 0. In a case where the integrated score has reached the upper limit threshold value or the lower limit threshold value and the class determination unit 187 selects either of the classes, a score of a selected class is more than 0 and a score of an unselected class is less than 0.

Alternatively, the integrated score calculation unit 185 may calculate a score of each class by applying a feature amount to a well-known classification algorithm that calculates a score of each class and selects a class having the highest score.

Alternatively, in response to the integrated score being calculated on the basis of a plurality of elements, the integrated score calculation unit 185 may calculate a score obtained by integrating scores obtained for respective elements and respective classes, as a score of each class. For example, the integrated score calculation unit 185 may calculate a score of each class by summing or averaging scores for respective elements and respective classes obtained by applying each of feature amounts of all the elements used for calculating the integrated score to the class classification algorithm.

The integrated score calculation unit 185 calculates a score of each class by using a feature amount used for calculating the integrated score, and thus the score of a class selected by the class determination unit 187 on the basis of the integrated score is expected to be higher than the score of an unselected class.

As described above, the integrated score calculation unit 185 calculates the score of each class such that the score of a class selected on the basis of the integrated score is higher than the score of an unselected class. Consequently, in a case where a class corresponding to a correct answer is selected, the score of the class corresponding to the correct answer becomes a relatively great value. On the other hand, in a case where a class corresponding to an incorrect answer is selected, the score of the class corresponding to the incorrect answer becomes a relatively small value.

Therefore, the reliability learning unit 191 learns to calculate an index value of the reliability such that a score of a class corresponding to the correct answer is calculated as an index value of the reliability of the integrated score. That is, as described above, the reliability learning unit 191 learns to calculates an index value of the reliability such that an index value of the reliability calculated by the reliability calculation unit 190 is the same as or similar to a score of a class corresponding to the correct answer among scores of respective classes.

Consequently, an index value of the reliability calculated by the reliability calculation unit 190 is expected to be a relatively great value in a case where a class corresponding to a correct answer is selected, and is expected to be a relatively small value in a case where a class corresponding to an incorrect answer is selected.

For example, the reliability calculation unit 190 may be configured by using a neural network, and the reliability learning unit 191 may perform learning by using a well-known neural network learning algorithm.

As described above, the reliability calculation unit 190 may calculate an index value of the reliability of the integrated score even before the end condition for the binary classification is established. That is, it is unclear which class a classification target belongs to, and even at a stage where the determination device 100 further acquires an element of series data and performs the process of the binary classification, the reliability calculation unit 190 may calculate an index value of the reliability of the integrated score. In both the above example of the score calculation method for each class based on the integrated score and the example of the score calculation method for each class using a well-known classification algorithm, an index value can be calculated even at a stage where the integrated score has not reached a threshold value.

The reliability evaluation unit 192 stops calculation of the integrated score by the score calculation unit 182 in a case where the reliability of the integrated score is lower than a predetermined condition.

Consequently, in a case where the determination device 100 cannot obtain a final determination result as to which of the two classes a classification target belongs to, or in a case where it is expected that an obtained final determination result is likely to be incorrect, the process of the binary classification can be stopped at a relatively early stage.

As described above, in a case where new series data can be acquired, the determination device 100 may acquire the new series data and perform the process of the binary classification again. In a case where new series data cannot be acquired, the determination device 100 may output an alarm indicating that the process has been interrupted.

The class determination unit 187 may determine a determination result of the binary classification on the basis of an index value of the reliability of the integrated score in addition to the integrated score. For example, even in a case where the integrated score has reached an upper limit threshold value or a lower limit threshold value, if the reliability of the integrated score is lower than a predetermined threshold value, a determination result of the class classification may be determined as the class indetermination.

Consequently, the determination device 100 can make a more careful determination in a case where the reliability of the integrated score is low. Specifically, in a case where the reliability of the integrated score is low, the determination device 100 can further wait for an element of series data.

The remaining time estimation unit 193 calculates an index value of the remaining time required for the class determination unit 187 to determine a final determination result of the binary classification as either of the two classes.

For example, the remaining time estimation unit 193 may calculate, as an index value of the remaining time, an estimated value of the number of times of update of the integrated score required for the integrated score to reach the upper limit threshold value or the lower limit threshold value of the integrated score. For example, the remaining time estimation unit 193 may divide the integrated score by the number of times of update of the integrated score to calculate an average value of an amount of change in the integrated score. The remaining time estimation unit 193 may divide a difference between the integrated score and the upper limit threshold value or the lower limit threshold value of the integrated score by the average value of the amount of change in the integrated score, to calculate an estimated value of the number of times of update of the integrated score required for the integrated score to reach the upper limit threshold value or the lower limit threshold value of the integrated score.

As described above, the display unit 120 may display the index value of the remaining time calculated by the remaining time estimation unit 193.

Second Embodiment

In second to seventh embodiments, an example in which the determination device 100 includes some of the respective units illustrated in FIG. 1 will be described. A plurality of embodiments from the second to seventh embodiments may be combined and implemented.

Figure 7:
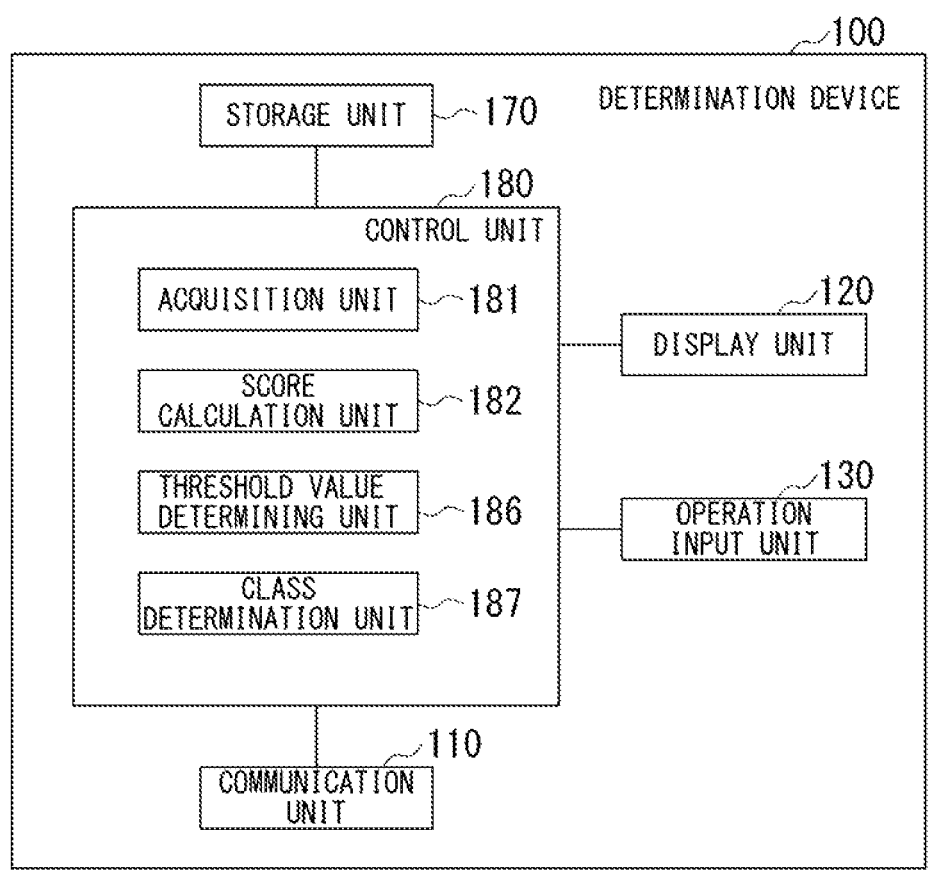
FIG. 7 is a schematic block diagram illustrating an example of a functional configuration of a determination device according to a second embodiment.

FIG. 7 is a schematic block diagram illustrating an example of a functional configuration of the determination device according to the second embodiment. In the configuration of the determination device 100 illustrated in FIG. 7, among the units of the determination device 100 illustrated in FIG. 1, the communication unit 110, the display unit 120, the operation input unit 130, the storage unit 170, the control unit 180, the acquisition unit 181, the score calculation unit 182, the threshold value determining unit 186, and the class determination unit 187 are illustrated.

Each of these units is the same as in the case of the first embodiment.

Figure 8:
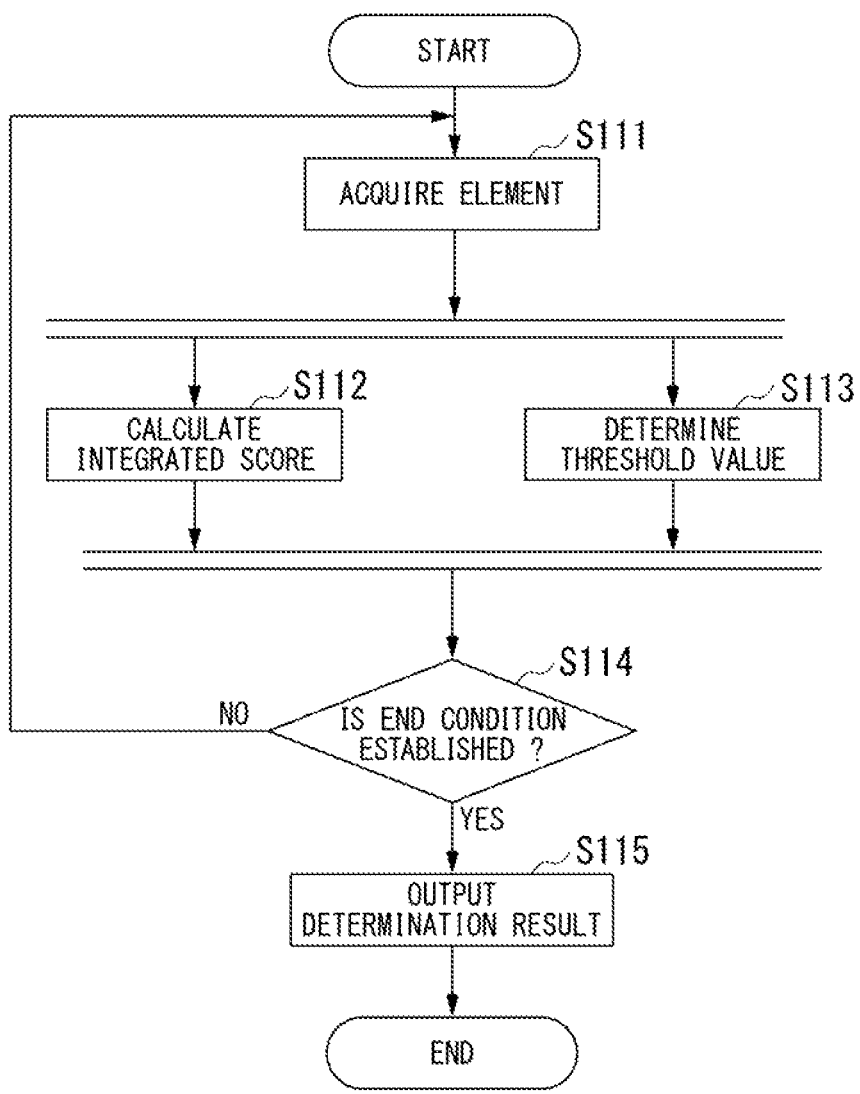
FIG. 8 is a flowchart illustrating an example of a process procedure in which the determination device according to the second embodiment dynamically changes a threshold value of an integrated score to perform binary classification.

FIG. 8 is a flowchart illustrating an example of a process procedure in which the determination device 100 dynamically changes a threshold value of an integrated score to perform the binary classification.

In the process in FIG. 8, the acquisition unit 181 acquires an element of series data (step S111).

After step S111, the score calculation unit 182 calculates an integrated score by using the element acquired by the acquisition unit 181 (step S112). The threshold value determining unit 186 determines an upper limit threshold value and a lower limit threshold value of the integrated score (step S113).

After step S112 and step S113, the class determination unit 187 determines whether or not an end condition for binary classification is established (step S114). In a case where the class determination unit 187 determines that the end condition is not established (step S114: NO), the process returns to step S111.

On the other hand, in a case where it is determined that the end condition is established (step S114: YES), the class determination unit 187 determines and outputs a final determination result of the binary classification (step S115). For example, the class determination unit 187 may display the final determination result of the binary classification on the display unit 120.

After step S115, the determination device 100 finishes the process in FIG. 8.

As described above, the acquisition unit 181 sequentially acquires a plurality of elements included in the series data related to the classification target. The score calculation unit 182 calculates an integrated score for the binary classification of the classification target each time the acquisition unit 181 acquires the elements of the series data. The threshold value determining unit 186 determines an upper limit threshold value and a lower limit threshold value of the integrated score each time the acquisition unit 181 acquires the elements of the series data. Each time the acquisition unit 181 acquires the elements of the series data, the class determination unit 187 determines a final determination result of the binary classification as either of the two classes or the class indetermination on the basis of comparison between the integrated score and the upper limit threshold value and the lower limit threshold value.

As described above, the threshold value determining unit 186 determines the upper limit threshold value and the lower limit threshold value of the integrated score, and can thus dynamically adjust the relationship between the accuracy of the class classification and the time required for the classification. In particular, the threshold value determining unit 186 can improve the accuracy of the class classification by increasing the upper limit threshold value and decreasing the lower limit threshold value. On the other hand, the threshold value determining unit 186 can reduce the remaining time required for the class classification by decreasing the upper limit threshold value and increasing the lower limit threshold value.

The threshold value determining unit 186 may determine the upper limit threshold value and the lower limit threshold value such that the upper limit threshold value and the lower limit threshold value become the same value in a case where a predetermined end condition is established.

Consequently, the determination device 100 can ensure that a classification target is classified into either of the two classes. That is, it is possible to prevent the determination device 100 from determining a final determination result of the binary classification as the class indetermination.

The threshold value determining unit 186 may determine the upper limit threshold value and the lower limit threshold value such that the upper limit threshold value monotonically decreases and the lower limit threshold value monotonically increases according to an increase in the number of elements acquired by the acquisition unit 181.

Consequently, the determination device 100 can perform determination with higher accuracy in a case where a final determination result of the binary classification can be obtained in a relatively short time, and can reduce the remaining time required for the determination in a case where it takes time to obtain the final determination result of the binary classification. It is possible to reduce the probability that the determination device 100 determines a final determination result of the binary classification as the class indetermination.

The threshold value determining unit 186 may determine the upper limit threshold value and the lower limit threshold value such that the upper limit threshold value monotonically increases and the lower limit threshold value monotonically decreases according to an increase in the number of elements acquired by the acquisition unit 181.

Consequently, in the determination device 100, in a case where the integrated score increases sharply and the integrated score decreases sharply, a final determination result of the binary classification can be obtained in a relatively short time, and in a case where a change in the integrated score is relatively small, determination can be performed more carefully.

In a case where the integrated score increases sharply, it is expected that the integrated score will reach the upper limit threshold value even if the upper limit threshold value is increased, and a final determination result of the binary classification will not change. Similarly, in a case where the integrated score decreases sharply, it is expected that the integrated score will reach the lower limit threshold value even if the lower limit threshold value is reduced, and a final determination result of the binary classification will not change. In these cases, the threshold value determining unit 186 can obtain the final determination result faster by reducing the upper limit threshold value or increasing the lower limit threshold value.

On the other hand, if a change in the integrated score is small, the integrated score can reach either the upper limit threshold value or the lower limit threshold value depending on the subsequent change in the integrated score. In this case, the threshold value determining unit 186 increases the upper limit threshold value and decreases the lower limit threshold value, and thus determination can be performed carefully by using more elements.

In a case where the predetermined end condition is established, and the integrated score is less than the upper limit threshold value and more than the lower limit threshold value, the class determination unit 187 may determine a class of a classification target as a third class.

By referring to this classification result, a user can understand the result that the class cannot be determined as either of the two classes. That is, it can be understood that accurate binary classification is difficult from the obtained series data.

Third Embodiment

Figure 9:
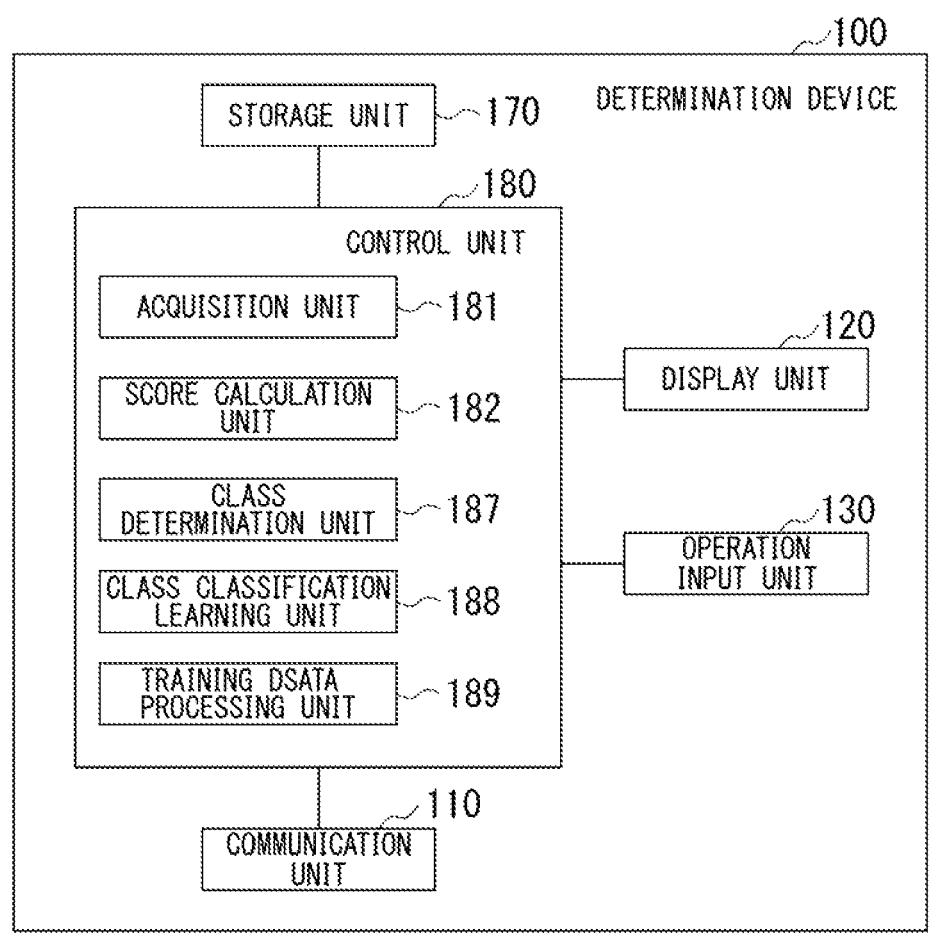
FIG. 9 is a schematic block diagram illustrating an example of a functional configuration of a determination device according to a third embodiment.

FIG. 9 is a schematic block diagram illustrating an example of a functional configuration of the determination device according to the third embodiment. In the configuration of the determination device 100 illustrated in FIG. 9, among the units of the determination device 100 illustrated in FIG. 1, the communication unit 110, the display unit 120, the operation input unit 130, the storage unit 170, the control unit 180, the acquisition unit 181, the score calculation unit 182, the class determination unit 187, the class classification learning unit 188, and the training data processing unit 189 are illustrated.

Each of these units is the same as in the case of the first embodiment.

Figure 10:
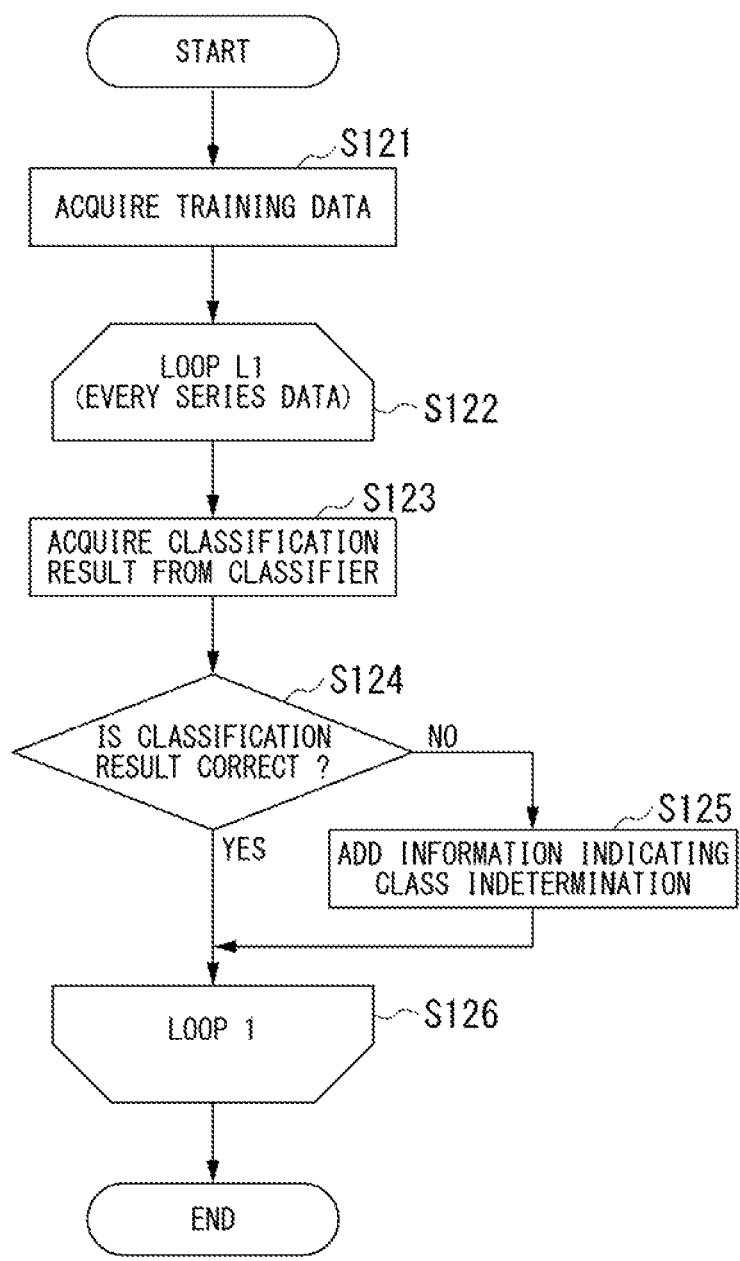
FIG. 10 is a flowchart illustrating an example of a process procedure in which the determination device according to the third embodiment processes training data.

FIG. 10 is a flowchart illustrating an example of a process procedure in which the determination device 100 processes training data.

In the process in FIG. 10, the training data processing unit 189 acquires training data (step S121). Here, the training data processing unit 189 acquires the training data in which series data is associated with either of the two classes as a correct answer to the binary classification. That is, the training data processing unit 189 acquires the training data in which information regarding the class indetermination is not shown.

Next, the training data processing unit 189 starts a loop L1 in which the process is performed for each piece of series data included in the training data (step S122). The series data that is a processing target in the loop L1 will be referred to as target series data.

In the process in the loop L1, the training data processing unit 189 acquires a classification result in a case where elements of the target series data are sequentially input to a classifier (step S123).

The training data processing unit 189 may include a classifier and actually receive elements for the classifier. Alternatively, the training data processing unit 189 may acquire information regarding a classification result by the classifier in advance and read the classification result from the information.

The classifier here may be any of various classifiers that sequentially acquire elements of series data and perform binary classification. A classifier that determines a classification result as either of the two classes may be used. Alternatively, a classifier that determines a classification result as either of the two classes or the class indetermination may be used. A classifier that outputs a classification result similar to that of the binary classification performed by the determination device 100 is more preferable.

Next, the training data processing unit 189 determines whether or not a classification result by the classifier is correct (step S124). In a case where the classification result by the classifier is the same class as the correct answer, the training data processing unit 189 determines that the classification result is correct. On the other hand, the training data processing unit 189 determines that the classification result is incorrect in both a case where the classification result by the classifier is a class different from the correct answer and a case where the classification result by the classifier is the class indetermination.

In a case where it is determined that the classification result is correct (step S124: YES), the training data processing unit 189 performs termination processing of the loop L1 (step S126). Specifically, the training data processing unit 189 determines whether or not the process in the loop L1 has been performed on all the pieces of series data included in the training data. In a case where it is determined that there is unprocessed series data, the training data processing unit 189 continues to perform the process in the loop L1 on the unprocessed series data. On the other hand, in a case where it is determined that the process in the loop L1 has been performed on all the pieces of series data included in the training data, the training data processing unit 189 finishes the loop L1.

In a case where the training data processing unit 189 finishes the loop L1 in step S126, the determination device 100 finishes the process in FIG. 10.

On the other hand, in a case where it is determined in step S124 that the classification result is incorrect (step S124: NO), the training data processing unit 189 associates the target series data with information indicating the class indetermination as a correct answer to the binary classification (step S125). The training data processing unit 189 may leave information indicating either of the two classes originally associated with the target series data as a correct answer to the binary classification, and may further associate information indicating the class indetermination. Alternatively, the training data processing unit 189 associates the target series data with information indicating that the class is undetermined, instead of the information indicating either of the two classes originally associated with the target series data as the correct answer to the binary classification.

After step S125, the process transitions to step S126.

Figure 11:
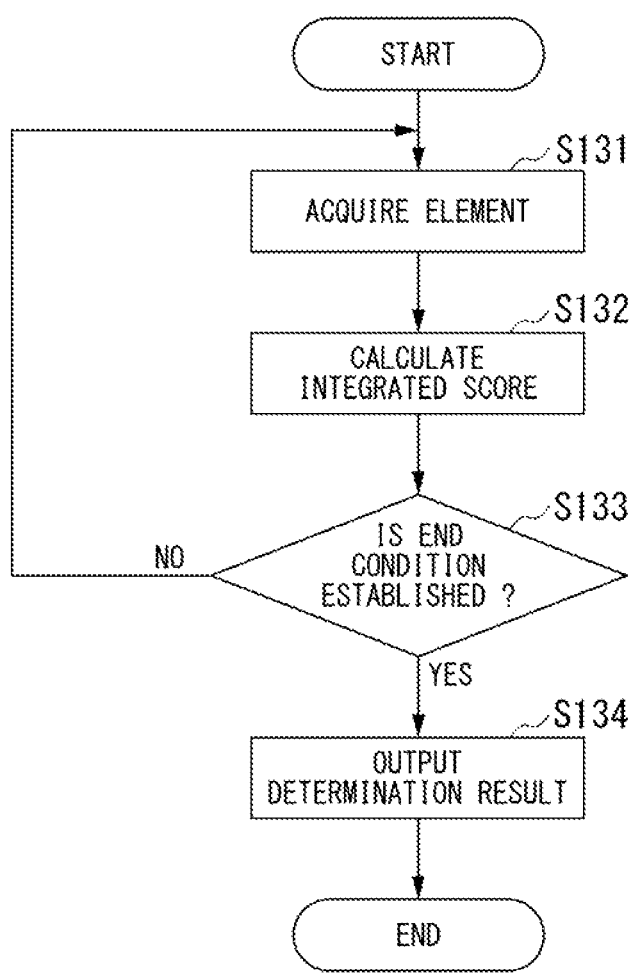
FIG. 11 is a flowchart illustrating an example of a process procedure in which the determination device according to the third embodiment performs binary classification.

FIG. 11 is a flowchart illustrating an example of a process procedure in which the determination device 100 performs binary classification.

In the process in FIG. 11, the acquisition unit 181 acquires elements of series data (step S131).

Next, the score calculation unit 182 calculates an integrated score by using the elements acquired by the acquisition unit 181 (step S132). Due to learning performed by the class classification learning unit 188, it is expected that the score calculation unit 182 will not greatly change a value of the integrated score for an element for which it is not clear which of the two classes a classification target belongs to.

Next, the class determination unit 187 determines whether or not an end condition for the binary classification is established (step S133). In a case where the class determination unit 187 determines that the end condition is not established (step S133: NO), the process returns to step S131.

On the other hand, in a case where it is determined that the end condition is established (step S133: YES), the class determination unit 187 determines and outputs a final determination result of the binary classification (step S134). For example, the class determination unit 187 may display the final determination result of the binary classification on the display unit 120.

After step S134, the determination device 100 finishes the process in FIG. 11.

As described above, the acquisition unit 181 sequentially acquires a plurality of elements included in the series data related to the classification target. The score calculation unit 182 calculates an integrated score for the binary classification of the classification target each time the acquisition unit 181 acquires the elements of the series data. Each time the acquisition unit 181 acquires the elements of the series data, the class determination unit 187 determines a determination result of the binary classification as either of the two classes or the class indetermination on the basis of comparison between the integrated score and the upper limit threshold value and the lower limit threshold value of the integrated score. The class classification learning unit 188 learns to calculate the integrated score such that the integrated score has a value between the upper limit threshold value and the lower limit threshold value for series data in which the class indetermination is shown by using training data including the series data in which the class indetermination is shown as a correct answer to the binary classification.

Consequently, the determination device 100 is expected to wait for input of the next element without greatly changing the integrated score for an element for which it is not clear which of the two classes the classification target belongs to.

Here, a case is considered in which learning is performed to calculate an integrated score by using training data in which either of the two classes is shown as a correct answer to the binary classification and the class indetermination is not shown. In this case, it is considered that the score calculation unit 182 greatly changes the integrated score such that the integrated score approaches either an upper limit threshold value or a lower limit threshold value for all elements.

On the other hand, in the determination device 100, the score calculation unit 182 is expected to calculate a value between the upper limit threshold value and the lower limit threshold value for the element for which the class indetermination is appropriate. Therefore, the determination device 100 is expected to wait for input of the next element without greatly changing the integrated score for an element for which it is unclear which of the two classes a classification target belongs to.

The class classification learning unit 188 may learn to calculate the integrated score by using a loss function that provides high evaluation in a case where the integrated score has a value between the upper limit threshold value and the lower limit threshold value for series data in which the class indetermination is shown among the pieces of series data included in the training data.

Consequently, the score calculation unit 182 is expected to calculate a value between the upper limit threshold value and the lower limit threshold value for an element for which the class indetermination is appropriate. Therefore, the determination device 100 is expected to wait for input of the next element without greatly changing the integrated score for an element for which it is unclear which of the two classes a classification target belongs to.

The class classification learning unit 188 may perform learning by using a loss function that includes a term for calculating a loss in a case where a classification target is not classified into either class on the basis of a correct answer of training data and refers to a function for calculating a loss in a case where a classification target is regarded to belong to either class on the basis of the correct answer of the training data. Consequently, it is possible to use a well-known method for determining which of the two classes a classification target belongs to.

In a case where a classification result when the binary classification is performed on training data in which series data is associated with either of the two classes as a correct answer to the binary classification by using a predetermined classifier is different from the correct answer, the training data processing unit 189 may associate the series data with information indicating the class indetermination as a correct answer to the binary classification.

Consequently, it is possible to obtain training data including not only series data in which either of the two classes is shown as a correct answer to the binary classification but also series data in which class unclearness is shown. The class classification learning unit 188 learns to calculate the integrated score by using this training data, and thus, as described above, the score calculation unit 182 is expected to calculate a value between the upper limit threshold value and the lower limit threshold value for an element for which the class indetermination is appropriate.

Fourth Embodiment

Figure 12:
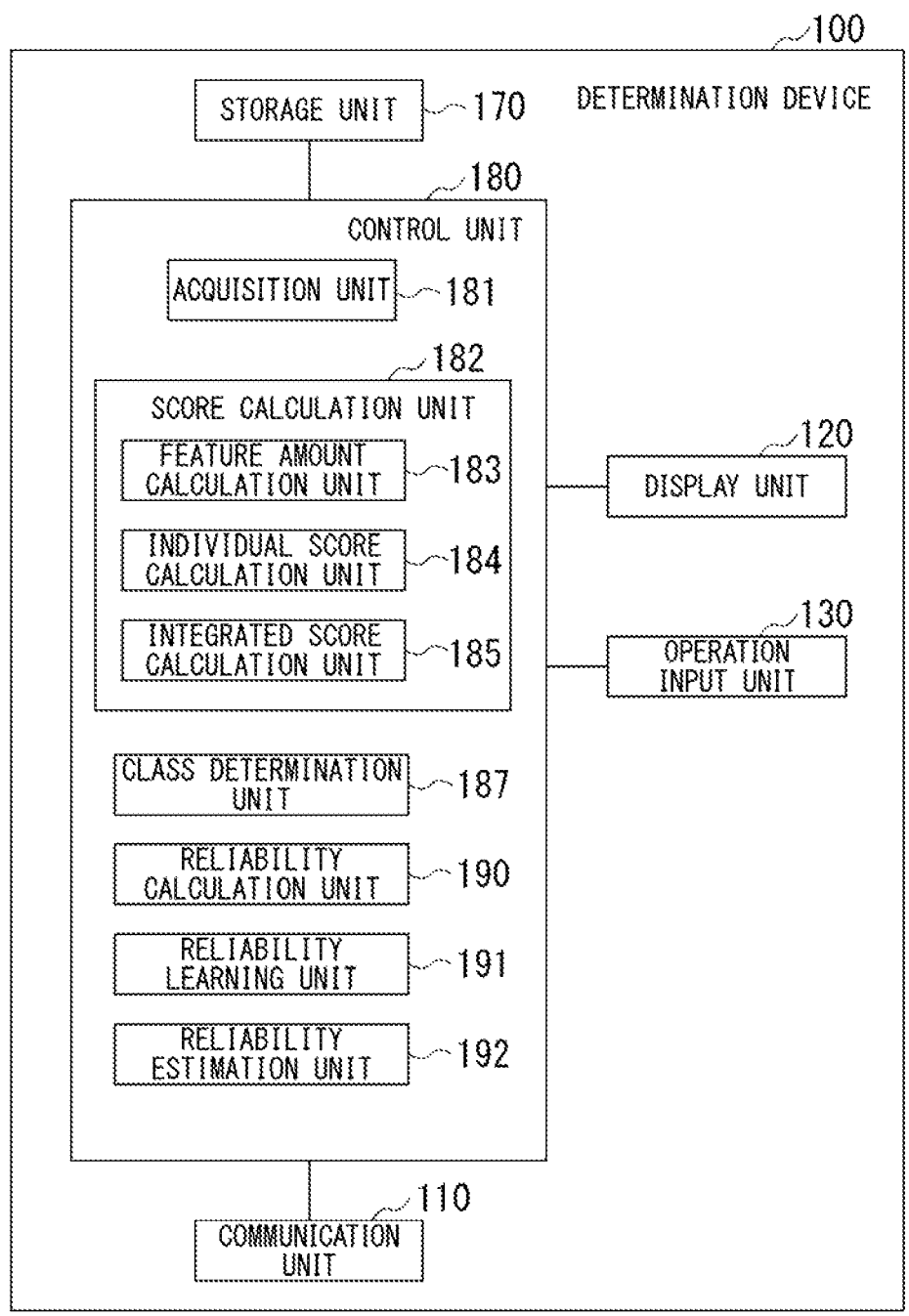
FIG. 12 is a schematic block diagram illustrating an example of a functional configuration of a determination device according to a fourth embodiment.

FIG. 12 is a schematic block diagram illustrating an example of a functional configuration of the determination device according to the fourth embodiment. In the configuration of the determination device 100 illustrated in FIG. 12, among the units of the determination device 100 illustrated in FIG. 1, the communication unit 110, the display unit 120, the operation input unit 130, the storage unit 170, the control unit 180, the acquisition unit 181, the score calculation unit 182, the feature amount calculation unit 183, the individual score calculation unit 184, the integrated score calculation unit 185, the class determination unit 187, the reliability calculation unit 190, the reliability learning unit 191, and the reliability evaluation unit 192 are illustrated.

Each of these units is the same as in the case of the first embodiment.

Figure 13:
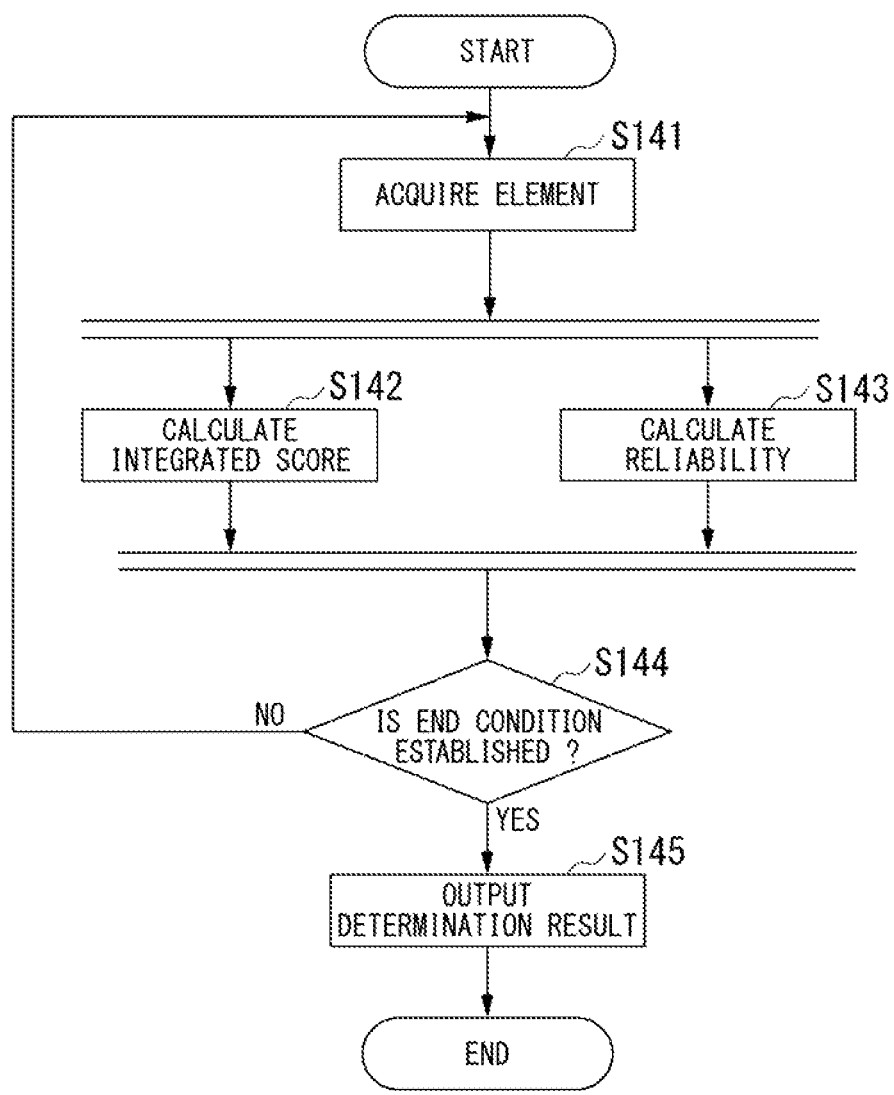
FIG. 13 is a flowchart illustrating an example of a process procedure in which the determination device according to the fourth embodiment performs binary classification on a classification target.

FIG. 13 is a flowchart illustrating an example of a process procedure in which the determination device 100 performs binary classification of a classification target. In the example in FIG. 13, the determination device 100 calculates the reliability of an integrated score.

In the process of FIG. 13, the acquisition unit 181 acquires an element of series data (step S141).

After step S111, the score calculation unit 182 calculates an integrated score by using the element acquired by the acquisition unit 181 (step S142). The reliability calculation unit 190 calculates the reliability of the integrated score (step S143).

After step S142 and step S143, the class determination unit 187 determines whether or not an end condition for the binary classification is established (step S144). In a case where the class determination unit 187 determines that the end condition is not established (step S144: NO), the process returns to step S141.

On the other hand, in a case where it is determined that the end condition is established (step S144: YES), the class determination unit 187 determines and outputs a final determination result of the binary classification (step S145). For example, the class determination unit 187 may display the final determination result of the binary classification on the display unit 120.

After step S145, the determination device 100 finishes the process in FIG. 13.

As described above, the acquisition unit 181 sequentially acquires a plurality of elements included in the series data related to the classification target. The score calculation unit 182 calculates an integrated score for the binary classification of the classification target each time the acquisition unit 181 acquires the elements of the series data. Each time the acquisition unit 181 acquires the elements of the series data, the class determination unit 187 determines a final determination result of the binary classification as either of the two classes or the class indetermination on the basis of comparison between the integrated score and the upper and lower limit threshold values of the integrated score. The reliability calculation unit 190 calculates an index value of the reliability of the integrated score on the basis of history information of the integrated score or a feature amount of the element used for calculating the integrated score. The reliability calculation unit 190 can support to ascertain the validity of determination of the binary classification by calculating the index value of the reliability of the integrated score used for the determination of the binary classification. The determination device 100 may present the index value of the reliability to a user.

The feature amount calculation unit 183 may calculate a feature amount of each element of the series data, and the integrated score calculation unit 185 may calculate an integrated score and a score of each class on the basis of the feature amount calculated by the feature amount calculation unit 183. The reliability learning unit 191 may learn to calculate an index value of the reliability of the integrated score such that the index value of the reliability is the same as or similar to a score of a class corresponding to the correct answer among scores of respective classes by using training data in which the series data is associated with correct answer information regarding which of the two classes a classification target belongs to in a case of the series data.

Consequently, an index value of the reliability calculated by the reliability calculation unit 190 is expected to be a relatively great value in a case where a class corresponding to a correct answer is selected, and is expected to be a relatively small value in a case where a class corresponding to an incorrect answer is selected.

The reliability evaluation unit 192 may stop calculation of the integrated score by the score calculation unit in a case where the reliability of the integrated score is lower than a predetermined condition.

Consequently, in a case where the determination device 100 cannot obtain a final determination result as to which of the two classes a classification target belongs to, or in a case where it is expected that an obtained final determination result is likely to be incorrect, the process of the binary classification can be stopped at a relatively early stage.

In a case where new series data can be acquired, the determination device 100 may acquire the new series data and perform the process of the binary classification again. In a case where new series data cannot be acquired, the determination device 100 may output an alarm indicating that the process has been interrupted.

The class determination unit 187 may determine a determination result of the binary classification as either of the two classes or the class indetermination on the basis of the comparison between the integrated score and the upper and lower limit threshold values of the integrated score and the reliability.

As described above, the class determination unit 187 determines the determination result of the binary classification on the basis of the reliability of the integrated score in addition to the integrated score. Therefore, in a case where the reliability of the integrated score is low, the determination can be performed more carefully. Specifically, in a case where the reliability of the integrated score is low, the determination device 100 can further wait for the element of the series data.

Fifth Embodiment

Figure 14:
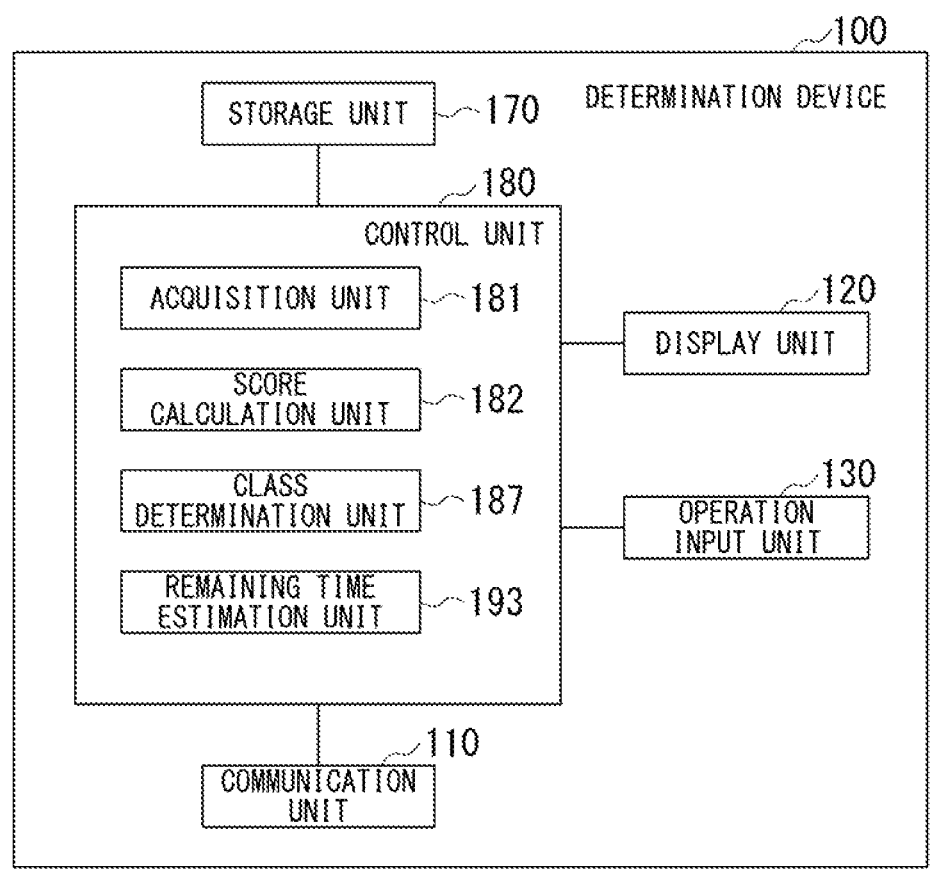
FIG. 14 is a schematic block diagram illustrating an example of a functional configuration of a determination device according to a fifth embodiment.

FIG. 14 is a schematic block diagram illustrating an example of a functional configuration of the determination device according to the fifth embodiment. In the configuration of the determination device 100 illustrated in FIG. 14, among the units of the determination device 100 illustrated in FIG. 1, the communication unit 110, the display unit 120, the operation input unit 130, the storage unit 170, the control unit 180, the acquisition unit 181, the score calculation unit 182, the class determination unit 187, and the remaining time estimation unit 193 are illustrated.

Each of these units is the same as in the case of the first embodiment.

As described above, the acquisition unit 181 sequentially acquires a plurality of elements included in the series data related to the classification target. The score calculation unit 182 calculates an integrated score for the binary classification of the classification target each time the acquisition unit 181 acquires the elements of the series data. Each time the acquisition unit 181 acquires the elements of the series data, the class determination unit 187 determines a determination result of the binary classification as either of the two classes or the class indetermination on the basis of comparison between the integrated score and the upper limit threshold value and the lower limit threshold value of the integrated score. The remaining time estimation unit 193 calculates an index value of the remaining time required for the class determination unit 187 to determine a final determination result of the binary classification as either of the two classes.

As described above, the remaining time estimation unit 193 can support to ascertain a process status by calculating the index value of the remaining time required for the process of the binary classification. The determination device 100 may present the index value of the remaining time to a user.

The remaining time estimation unit 193 may calculate an estimated value of the number of times of update of the integrated score required for the integrated score to reach the upper limit threshold value or the lower limit threshold value of the integrated score by dividing the integrated score by the number of times of update of the integrated score to calculate the average value of the amount of change in the integrated score, and by dividing a difference between the integrated score and the upper limit threshold value or the lower limit threshold value of the integrated score by the average value of the amount of change in the integrated score.

Consequently, the remaining time estimation unit 193 can calculate an index value of the remaining time through relatively simple calculation such as calculation and division of the average value.

The display unit 120 may indicate a magnitude of the index value of the remaining time with a blinking pattern of a lamp.

Consequently, the display unit 120 can display the index of the remaining time by using an inexpensive and compact display device such as a lamp without using a display screen. For example, even in a case where the display unit 120 does not have a display screen, or the display screen of the display unit 120 is small, the increase in device cost of the determination device 100 for displaying the index of the remaining time and the increase in size of the determination device 100 are small.

The display unit 120 may include a remaining time display unit that indicates the magnitude of the index value of the remaining time as a one-digit number.

Consequently, the display unit 120 can display the index of the remaining time by using an inexpensive and compact display device such as a single seven-segment display without using a display screen. For example, even in a case where the display unit 120 does not have a display screen, or the display screen of the display unit 120 is small, the increase in device cost of the determination device 100 for displaying the index of the remaining time and the increase in size of the determination device 100 are small.

Sixth Embodiment

In the sixth embodiment, an example in which the determination device 100 is used for determining the presence or absence of processing of an image is illustrated.

Figure 15:
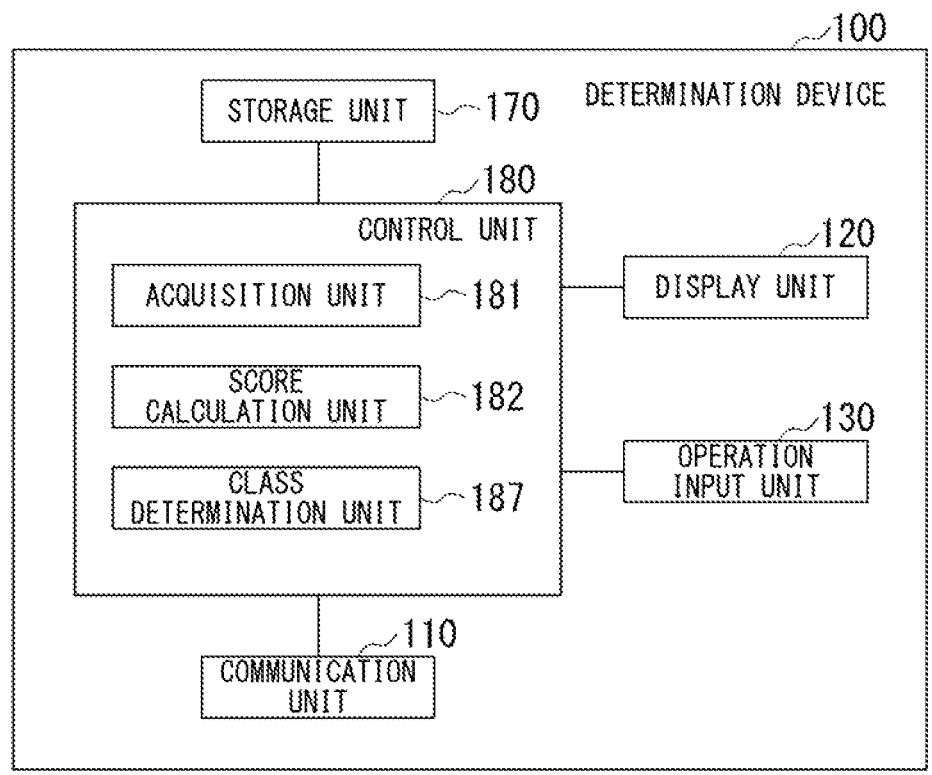
FIG. 15 is a schematic block diagram illustrating an example of a functional configuration of a determination device according to a sixth embodiment.

FIG. 15 is a schematic block diagram illustrating an example of a functional configuration of the determination device according to the sixth embodiment. In the configuration of the determination device 100 illustrated in FIG. 15, among the units of the determination device 100 illustrated in FIG. 1, the communication unit 110, the display unit 120, the operation input unit 130, the storage unit 170, the control unit 180, the acquisition unit 181, the score calculation unit 182, and the class determination unit 187 are illustrated.

Hereinafter, differences in the processes of each unit of the determination device 100 according to the sixth embodiment from the case of the first embodiment will be described. The remaining processes are the same as in the case of the first embodiment.

The determination device 100 according to the sixth embodiment may include some of the respective units illustrated in FIG. 1 in addition to the respective units illustrated in FIG. 15. Alternatively, the determination device 100 according to the sixth embodiment may include all of the respective units illustrated in FIG. 1.

The acquisition unit 181 acquires a partial image of a target image. Here, the target image is a determination target image for the presence or absence of processing. The target image corresponds to an example of a classification target.

The partial image acquired by the acquisition unit 181 corresponds to an example of an element of series data. As described above in the first embodiment, the communication unit 110 may receive an image that is a determination target as image data, and the acquisition unit 181 may acquire a partial image of the image that is a determination target as image data.

The acquisition unit 181 will also be referred to as a partial image acquisition unit.

The acquisition unit 181 repeatedly acquires a partial image of the target image. In the same manner as in the case of the first embodiment, the acquisition unit 181 may repeatedly acquire the partial image of the target image until a predetermined end condition is established.

A detailed method in which the acquisition unit 181 repeatedly acquires a partial image of the target image is not limited to a specific method. For example, the acquisition unit 181 may divide the target image into a plurality of partial images.

In this case, the acquisition unit 181 may select the plurality of partial images obtained through the division one by one in order according to an order in which the partial images are arranged in the target image. Alternatively, the acquisition unit 181 may select the plurality of partial images obtained through the division one by one in a random order.

Consequently, it is expected that the time required for the determination device 100 to determine the final determination result will be able to be reduced. For example, in a case where a chin portion of a face image has been processed, if the acquisition unit 181 selects the partial image in order from the top of the face image, it takes time to select a partial image including the processed portion.

On the other hand, in a case where the acquisition unit 181 selects the partial images in a random order, a partial image including a processed portion is expected to be selected at an earlier timing. In particular, in a case where one processed portion covers a plurality of partial images, the acquisition unit 181 is expected to select the partial images in a random order and thus to select one or more of partial images including the processed portion.

The number and the size of partial images generated by the acquisition unit 181 dividing a target image are not limited to specific ones. The acquisition unit 181 may experimentally determine how many partial images a target image is divided into in advance.

The acquisition unit 181 may divide only a part of the target image, such as dividing only a portion of the target image in which the face is captured.

In a case where an end condition for determining the presence or absence of processing is not established even if all of a plurality of partial images obtained by dividing the target image are selected, the acquisition unit 181 may divide the target image again according to another division method. Also in this case, the acquisition unit 181 may select the plurality of partial images obtained through the division one by one in order according to an order in which the partial images are arranged in the target image. Alternatively, the acquisition unit 181 may select the plurality of partial images obtained through the division one by one in a random order.

The acquisition unit 181 repeats the division of the target image and the selection of the partial images, and thus the determination device 100 can determine the presence or absence of processing with any accuracy. That is, even in a case where determination is obtained with high accuracy and many partial images are required to achieve the accuracy, the acquisition unit 181 can supply a necessary number of partial images.

Alternatively, the acquisition unit 181 may repeatedly perform the process of acquiring one partial image from the target image. In this case, the size of the partial image may differ each time the acquisition unit 181 acquires the partial image.

The acquisition unit 181 may acquire a partial image that partially overlaps with a partial image acquired in the past. As a partial image of the target image, the acquisition unit 181 may acquire an image corresponding to a further partial image of the partial image acquired in the past. The acquisition unit 181 may acquire an image including a partial image acquired in the past as a partial image of a target image.

The score calculation unit 182 calculates an integrated score in the same manner as in the case of the first embodiment. The integrated score calculated by the score calculation unit 182 is used as a score regarding the presence or absence of processing of a partial image acquired by the acquisition unit 181.

The score calculation unit 182 calculates the integrated score each time the acquisition unit 181 acquires a partial image.

The class determination unit 187 classifies the target image into either a class with processing or a class without processing. Consequently, the class determination unit 187 determines the presence or absence of the target image.

The class determination unit 187 will also be referred to as a processing determination unit.

The class determination unit 187 may determine the presence or absence of processing of a face image. For example, the class determination unit 187 may determine the presence or absence of processing through which a part of the face image of a certain person has been replaced with a part of the face image of another person.

In the processed image in which a part of the face image of a certain person has been replaced with a part of the face image of another person, the face image of another person is partially included, and thus the face image may look like a face image of a person different from the person in the original face image when viewed by a human. On the other hand, since the original face image is partially included, there is a probability that the person in the original face image may be authenticated at the time of face authentication.

As described above, there is a possibility that a processed image may be illegally used, such as causing erroneous authentication in a face authentication system, because the authentication of a person differs depending on whether determination is performed by a human or a machine.

For example, a case where face authentication is performed by using a photo of a passport or a photo of an admission card is considered. In this case, a person who illegally uses a photo generates a face image obtained by composing his/her face image with a face image of another person who is desired to be impersonated, and submits the photo for face authentication. Since the portion of the person's face image is included in the composite photo, the image becomes similar to the person, and when a person (face authentication staff) collates the photo with the person, it may be recognized as the person's photo. On the other hand, in face authentication by a face authentication system, since a portion of the face image of the person desired to be impersonated is included in the photo, the same feature amount as in the case of the person desired to be impersonated is extracted, and thus the face authentication system may erroneously authenticate the person as the person desired to be impersonated.

As described above, there is a possibility that immigration or admission may be performed illegally by passing both collation by a human and face authentication by the face authentication system.

In contrast, it is expected that fraud will be able to be prevented by the determination device 100 detecting that the image has been processed.

In a case where the score calculation unit 182 calculates an integrated score by using a neural network such as deep learning, the neural network is learned by using the type of image desired to be determined and training data of the type of processing desired to be determined. Therefore, it is expected that the determination accuracy of the presence or absence of the type of processing desired to be determined in the type of image desired to be determined will be improved.

In learning, supervised learning may be performed by using training data that includes both a processed image and an unprocessed image and in which a correct answer corresponding to the presence or absence of processing is shown.

However, a target image is not limited to a face image. Processing that is a determination target in the class determination unit 187 is not limited to a specific type of processing.

For example, the determination device 100 may determine the presence or absence of processing of a fingerprint image used for fingerprint authentication. Alternatively, the determination device 100 may determine the presence or absence of processing of general images, without limitation to a specific type of image.

Figure 16:
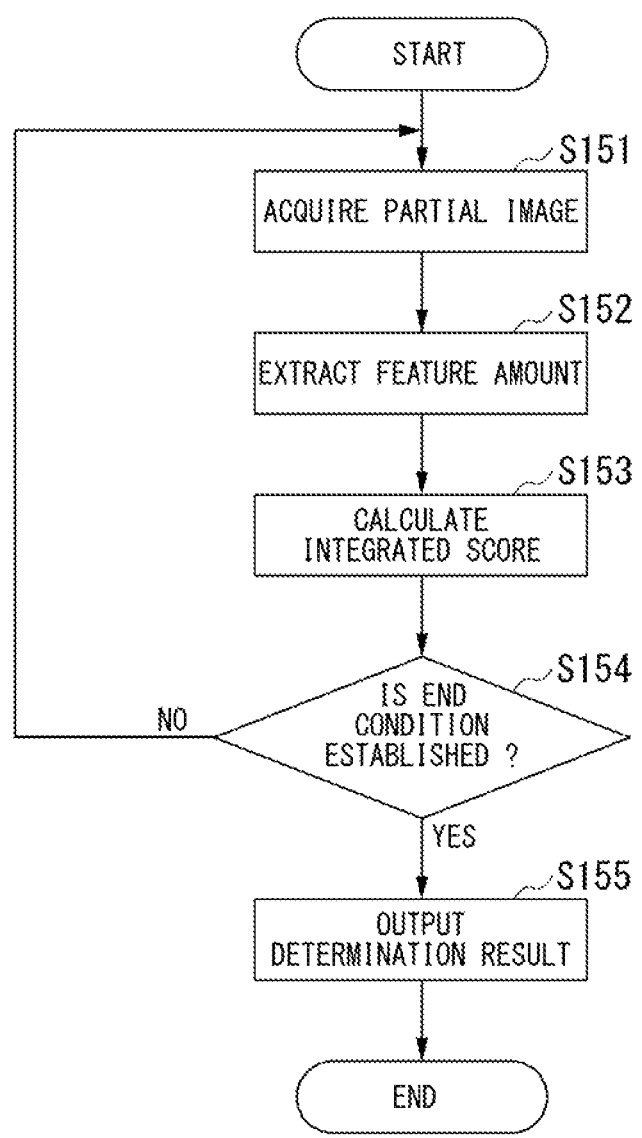
FIG. 16 is a flowchart illustrating an example of a process procedure in which the determination device according to the sixth embodiment determines the presence or absence of processing of a target image.

FIG. 16 is a flowchart illustrating an example of a process procedure in which the determination device 100 determines the presence or absence of processing of a target image.

In the process illustrated in FIG. 16, the acquisition unit 181 acquires a partial image of the target image (step S151).

Next, the score calculation unit 182 extracts a feature amount of the partial image acquired by the acquisition unit 181 (step S152). In the same manner as in the case of FIG. 1, the function of the score calculation unit 182 to extract a feature amount may be configured as the feature amount calculation unit 183.

The score calculation unit 182 calculates an integrated score on the basis of the extracted feature amount (step S153).

The class determination unit 187 determines whether or not an end condition is established (step S154). In a case where it is determined that the end condition is not established (step S154: NO), the process returns to step S151.

On the other hand, in a case where it is determined that the end condition is established (step S154: YES), the class determination unit 187 determines the presence or absence of processing of the target image (step S155).

The class determination unit 187 may determine a final determination result as either with processing or without processing. Alternatively, the class determination unit 187 may determine a final determination result as any of with processing, without processing, or processing unclearness. "Processing unclearness" corresponds to an example of "class indetermination" in the first embodiment. As described in the first embodiment, the class determination unit 187 may set whether or not to determine the final determination result that the presence or absence of processing is unclear by setting the upper limit threshold value and the lower limit threshold value of the integrated score and setting an end condition for class classification.

After step S155, the determination device 100 finishes the process in FIG. 16.

As described above, the acquisition unit 181 repeatedly acquires the partial image of the target image until a predetermined end condition is established. The score calculation unit 182 calculates an integrated score as a score regarding the presence or absence of processing of the partial image each time the acquisition unit 181 acquires the partial image. The class determination unit 187 determines the presence or absence of processing of the target image on the basis of the integrated score.

Consequently, the determination device 100 can repeatedly calculate the integrated score by using the partial image of the target image and determine the presence or absence of processing of the entire target image.

The accuracy of determination and the time required for determination can be adjusted by setting the end condition.

It is expected that the determination device 100 will be able to detect that the target image has been processed regardless of which portion of the target image has been processed by determining the presence or absence of processing by using the partial image of the target image.

If the determination device 100 determines the presence or absence of processing on the basis of the entire target image, there is a possibility that the determination accuracy of the presence or absence of processing of other portions may be lowered because the presence or absence of processing is determined by concentrating on a specific portion. For example, in a case where the determination device 100 learns to determine the presence or absence of processing by using training data including many face images in which the eye portion has been processed, there is a possibility that learning may be performed such that information regarding the eye portion is weighted and information regarding other portions is not fully utilized.

In contrast, in a case where the determination device 100 performs learning and determination by using the partial image of the face image, it is expected that the determination will be performed by focusing on what kind of processing evidence is present, not on which portion of the face. For example, the determination device 100 is expected to determine the presence or absence of traces of image processing that may occur in various portions of the face.

An example of traces of image processing that may occur in various portions of the face includes broken or double lines that should be a single line, such as a facial contour or an eye contour. Another example is that the color of a geometrically shaped portion in an image, such as a rectangular shape, is discontinuous with the color of the surrounding portion.

As described above, it is expected that the determination device 100 will be able to detect that the target image has been processed regardless of which portion of the target image has been processed.

The acquisition unit 181 divides the target image into a plurality of partial images, and selects the obtained plurality of partial images one by one in a random order. Consequently, it is expected that the time required for the determination device 100 to determine the final determination result will be able to be reduced.

In a case where the end condition is not established even if all the plurality of partial images obtained by dividing the target image are selected, the acquisition unit 181 divides the target image again according to another division method, and selects the plurality of obtained partial images one by one in a random order.

Consequently, the determination device 100 can determine the presence or absence of processing with any accuracy. That is, even in a case where determination with high accuracy is required and many partial images are required to achieve the accuracy, the acquisition unit 181 can supply a necessary number of partial images.

Seventh Embodiment

Figure 17:
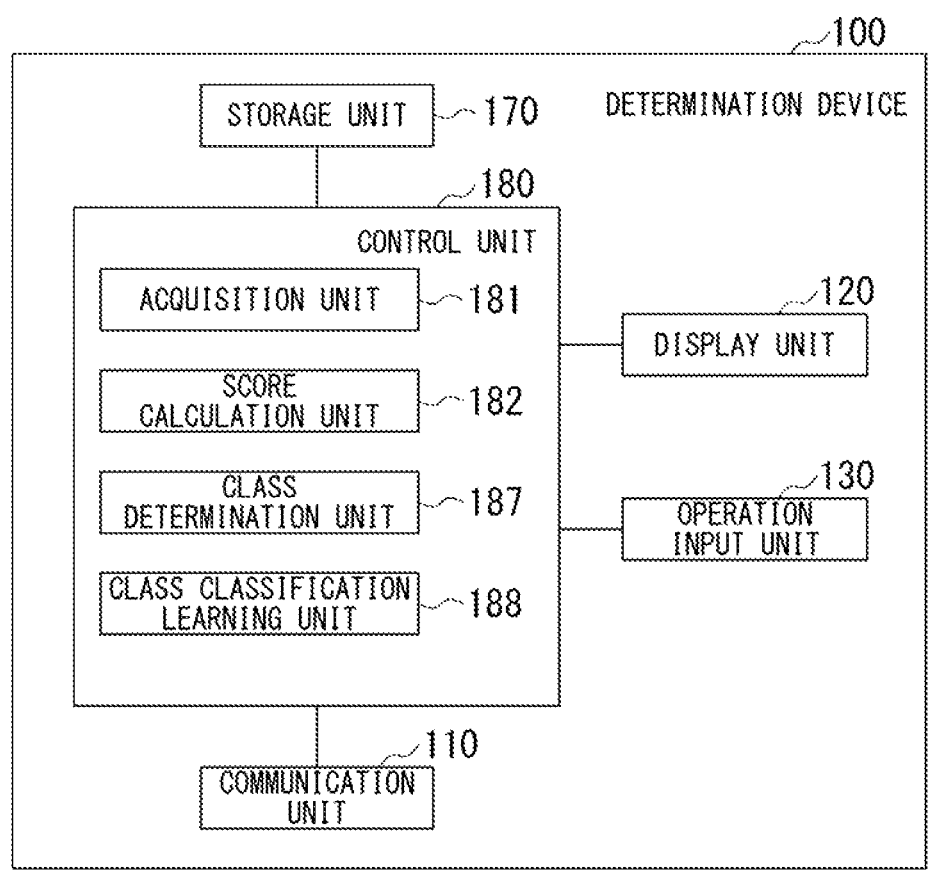
FIG. 17 is a schematic block diagram illustrating an example of a functional configuration of a determination device according to a seventh embodiment.

FIG. 17 is a schematic block diagram illustrating an example of a functional configuration of the determination device according to the seventh embodiment. In the configuration of the determination device 100 illustrated in FIG. 17, among the units of the determination device 100 illustrated in FIG. 1, the communication unit 110, the display unit 120, the operation input unit 130, the storage unit 170, the control unit 180, the acquisition unit 181, the score calculation unit 182, the class determination unit 187, and the class classification learning unit 188 are illustrated.

Each of these units is the same as in the case of the first embodiment.

As described above, a loss function used for the class classification learning unit 188 to learn calculation of an integrated score is not limited to that represented by the formulae (7) to (12). In the seventh embodiment, another example of a loss function used for the class classification learning unit 188 to learn calculation of an integrated score will be described.

In the seventh embodiment, a case of using the log-likelihood ratio "$\log[p(x^{(1)}, x^{(2)}, \ldots, x^{(t)}|y=1)/p(x^{(1)}, x^{(2)}, \ldots, x^{(t)}|y=0)]$" shown on the left side of the above the formulae (4) to (6) as the integrated score is considered.

The log-likelihood ratio is represented by, for example, the formula (5). There is an advantage in that a neural network can be configured such that the numerator "$p(y=1|x^{(i)}, \ldots, x^{(i-n)})$" of the first term and the denominator "$p(y=0|x^{(i)}, \ldots, x^{(i-n)})$" of the first term, and the numerator "$p(y=1|x^{(i-1)}, \ldots, x^{(i-n)})$" of the second term and the denominator "$p(y=0|x^{(i-1)}, \ldots, x^{(i-n)})$" of the second term on the right side of the formula (5) are outputs of the neural network.

Here, it is considered that the log-likelihood ratio is regarded as a probability density ratio, and the log-likelihood ratio is estimated by using a Kullback-Leibler importance optimization procedure (KLEAP) that is a density ratio estimation method.

The KLEAP is a method of estimating a probability density ratio by minimizing a KL distance (Kullback-Leibler Divergence), and a KL distance between any probabilities p and q is represented by the formula (13).

[Math. 13]

$$\int p \log \frac{p}{q} dx \qquad (13)$$

A true value of the probability that the classification target belongs to the class $C_1$ is expressed as "$p(X|y=1)$", and an estimated value is expressed as "$p\hat{}(X|y=1)$". A true value of the probability that the classification target belongs to the class $C_0$ is expressed as "$p(X|y=0)$", and an estimated value is expressed as "$p\hat{}(X|y=0)$".

The true value of a probability density ratio desired to be estimated is expressed as "$p(X|y=1)/p(X|y=0)$". When "$p\hat{}(X|y=1)/p(X|y=0)$" using the estimated value for the numerator of the probability density ratio desired to be estimated and the true value for the denominator is expressed as $r\hat{}(X)$, the formula (14) is given.

[Math. 14]

$$r^{\wedge} = \frac{p^{\wedge}(X \mid y = 1)}{p(X \mid y = 0)} \qquad (14)$$

It is considered that $p\hat{}(X|y=1)$ is brought close to $p(X|y=1)$ by minimizing the KL distance between $p(X|y=1)$ and $p\hat{}(X|y=1)$.

the formula (14) may be rewritten into "$p\hat{}(X|y=0)=p(X|y=0)r\hat{}(X)$", and by using this, a KL distance between $p\hat{}(X|y=1)$ and $p(X|y=1)$ is represented as in the formula (15).

[Math. 15]

$$\int p(X \mid y = 1) \log \frac{p(X \mid y = 1)}{p(X \mid y = 0) r^{\wedge}(X)} dx \qquad (15)$$

The minimization of the formula (15) is represented as in the formula (16) as the minimization of $r\hat{}(X)$ including the estimated value.

[Math. 16]

$$\min_{r^\wedge(X)} \left( \int p(X \mid y=1) \log \frac{p(X \mid y=1)}{p(X \mid y=0) r^\wedge(X)} dx \right) \quad (16)$$

In a case where the term in the log of the formula (16) is expanded and the term which can be regarded as a constant in relation to r^(X) is ignored, the formula (17) is given.

[Math. 17]

$$\min_{r^\wedge(X)} \left( \int -p(X \mid y=1) \log r^\wedge(X) dx \right) \quad (17)$$

That is, the minimization problem represented by the formula (16) may be replaced with the minimization problem represented by the formula (17).

The inside of the parenthesis of "min" in the formula (17) is represented as "$-\int p(X|y=1)\log(r^\wedge(X)) dx$" and may be handled as an expected value. Since the probability of computing this expected value is $p(X|y=1)$, in a case of applying it to training data, the expected value is computed by using the data X with label $y=1$, that is, data in which a correct answer is shown as the class $C_1$. Therefore, the minimization problem represented by the formula (17) may be replaced with a problem of minimizing the value of the formula (18).

[Math. 18]

$$\frac{1}{N_{H_1}} \sum_{i \in I_{H_1}} -\log r^\wedge(x^{(i)}) \quad (18)$$

Similarly, the formula (19) may be obtained from the minimization of the KL distance between $p(X|y=0)$ and $p^\wedge(X|y=0)$.

[Math. 19]

$$\frac{1}{N_{H_0}} \sum_{i \in I_{H_0}} \log r^\wedge(x^{(i)}) \quad (19)$$

It is considered that the minimization of values of the formulae (18) and (19) is applied to learning of calculation of an integrated score by the class classification learning unit 188. Therefore, it is considered that a loss function is formed and minimized by using the formulae (18) and (19).

However, if the formula (20) in which the weighting coefficients $\lambda_0$ and $\lambda_1$ are added to the formulae (19) and (18) is used as a loss function, the learning tends not to converge.

[Math. 20]

$$\lambda_0 \left( \frac{1}{N_{H_0}} \sum_{i \in I_{H_0}} \log r^\wedge(x^{(i)}) \right) + \lambda_1 \left( \frac{1}{N_{H_1}} \sum_{i \in I_{H_1}} \log r^\wedge(x^{(i)}) \right) \quad (20)$$

This is because a value range of log $(r^\wedge(x^{(i)}))$ is $(-\infty, \infty)$, and both the first term and the second term can be arbitrarily reduced, and thus learning falls into a special solution.

Therefore, it is considered that a value range of each term is made finite.

Here, the likelihood ratio is expressed as r^ as in the formula (21).

[Math. 21]

$$r^\wedge = \frac{p(x^{(1)}, x^{(2)}, \ldots, x^{(t)} \mid y=1)}{p(x^{(1)}, x^{(2)}, \ldots, x^{(t)} \mid y=0)} \quad (21)$$

For example, the class classification learning unit 188 may perform learning by using the loss function LOSS represented by the formula (22).

[Math. 22]

$$\text{LOSS} = \lambda_0 \left( \frac{1}{N_{H_0}} \sum_{i \in I_{H_0}} |0 - \sigma(\log r^\wedge)| \right) + \lambda_1 \left( \frac{1}{N_{H_1}} \sum_{i \in I_{H_1}} |1 - \sigma(\log r^\wedge)| \right) \quad (22)$$

σ indicates a sigmoid function.

By using the loss function represented by the formula (22), the class classification learning unit 188 performs learning such that a value of log-likelihood ratio log(r^) becomes as large as possible in order to bring the value of the sigmoid function close to 1 for series data in which the class $C_1$ is shown as the correct answer. The score calculation unit 182 calculates the log-likelihood ratio as an integrated score to a great value, and thus the integrated score can easily approach an upper limit threshold value.

For series data in which the class $C_0$ is shown as a correct answer, the class classification learning unit 188 performs learning such that the value of the log-likelihood ratio log(r^) becomes as small as possible in order to bring the value of the sigmoid function close to 0.

The score calculation unit 182 calculates the log-likelihood ratio as the integrated score to a small value, and thus the integrated score easily approaches a lower limit threshold value.

By using the loss function represented by the formula (22) together with the loss function in the conventional classification method, it is confirmed that learning converges and thus the accuracy of class classification is improved compared with a case where the loss function of the formula (22) is not used.

In a case where learning is performed by using the training data including the series data in which the class indetermination is shown a correct answer described in the second embodiment, the class classification learning unit 188 may perform the learning by using the loss function LOSS represented by the formula (23).

[Math. 23]

$$\text{LOSS} = \lambda_0 \left( \frac{1}{N_{H_0}} \sum_{i \in I_{H_0}} |0 - \sigma(\log r^\wedge)| \right) + \quad (23)$$

$$\lambda_1 \left( \frac{1}{N_{H_1}} \sum_{i \in I_{H_1}} |1 - \sigma(\log r^\wedge)| \right) + \lambda_B \left( \frac{1}{N_{H_B}} \sum_{i \in I_{H_B}} |0.5 - \sigma(\log r^\wedge)| \right)$$

The loss function LOSS represented by the formula (23) has the third term on the right side corresponding to the series data in which the class indetermination is shown as a correct answer. According to the third term on the right side, the class classification learning unit 188 performs learning such that a value of the log-likelihood ratio $\log(\hat{r})$ approaches 0 in order to bring a value of the sigmoid function close to 0.5 for the data series in which the class indetermination is shown as a correct answer.

In a case where the log-likelihood ratio is close to 0, the likelihood that a classification target belongs to the class $C_0$ and the likelihood that a classification target belongs to the class $C_1$ have about the same magnitude. In this case, it is considered appropriate that the class determination unit 187 determines a determination result of the binary classification as the class indetermination.

The score calculation unit 182 calculates the log-likelihood ratio as an integrated score to a value close to 0 such that the integrated score has a value between the upper limit threshold value and the lower limit threshold value, and the class determination unit 187 is expected to determine a determination result of binary classification as the class indetermination.

A function for making the value range of the term of the loss function finite is not limited to the sigmoid function, and may be any of various functions having a finite value range.

By using a differentiable function as a function for making the value range of the term of the loss function finite, a learning method such as back propagation is expected to be able to be applied.

The number of elements of series data used for the class classification learning unit 188 to learn calculation of an integrated score may be one or more. Therefore, in a case where a plurality of elements are included in the series data of the training data, the class classification learning unit 188 may perform learning by using all the plurality of elements, or by using only some of the plurality of elements.

For example, the class classification learning unit 188 may perform learning by using only one element among the elements included in the series data. Therefore, the class classification learning unit 188 may learn to calculate a score by using training data in which correct answer information is associated with a single piece of data instead of series data. That is, the class classification learning unit 188 may learn to calculate a score for class classification using a single piece of data instead of series data.

For example, in a case where the number of elements of the series data is large and it is expected that the learning will take a time, a user may perform a setting operation such that the class classification learning unit 188 performs learning by using only a predetermined number of elements of the series data.

In a case where the series data includes elements that are desired to be used for learning and elements that are not desired to be used, a user may be able to select a specific element to be used by the class classification learning unit 188.

The determination device 100 provided with the class classification learning unit 188 corresponds to an example of a learning device. Alternatively, the class classification learning unit 188 may be configured as a learning device different from the determination device 100.

As described above, the class classification learning unit 188 learns class classification of a classification target by using a loss function in which a loss is calculated to become smaller as a magnitude of a difference between a function value obtained by inputting a log-likelihood ratio to a function having a finite value range and a constant associated with a correct answer to class classification of the classification target becomes smaller, the log-likelihood ratio being the logarithm of the ratio between the likelihood that the classification target belongs to a first class and the likelihood that the classification target belongs to a second class.

According to the determination device 100, a technique for estimating the probability density can be reflected in machine learning of the class classification performed by the class classification learning unit 188. Consequently, the probability density ratio between the classes indicated by the training data is reflected in a model obtained through machine learning, and thus it is expected that a highly accurate model will be able to be obtained. By inputting the log-likelihood ratio for reflecting the probability density ratio in the loss function for learning to a function having a finite value range, the value range of the term of the loss function can be made finite, and thus the learning is expected to converge.

The class classification learning unit 188 may learn class classification of a classification target by using a value of a loss function in a case based on an element of series data and information indicating a correct answer on the basis of data including series data related to the classification target and the information indicating the correct answer to the class classification of the classification target for each piece of the series data.

Consequently, the class classification learning unit 188 can learn the class classification in which a determination result of the binary classification is determined as either of the two classes or the class indetermination each time an element of the series data is sequentially acquired.

The class classification learning unit 188 learns to classify the classification target by using a value of the loss function in a case based on some of the plurality of elements of the series data and the information indicating the correct answer.

Consequently, a user can adjust the number of elements used by the class classification learning unit 188 for learning. For example, in a case where the number of elements included in the series data is large and it is expected that learning will take a time, the user can designate the number of elements used for learning to reduce a learning time.

The user may designate elements used for the class classification learning unit 188 to perform learning. For example, in a case where the series data includes elements that are desired to be used for learning and elements that are not desired to be used, the user can select a specific element to be used by the class classification learning unit 188.

Eighth Embodiment

Figure 18:
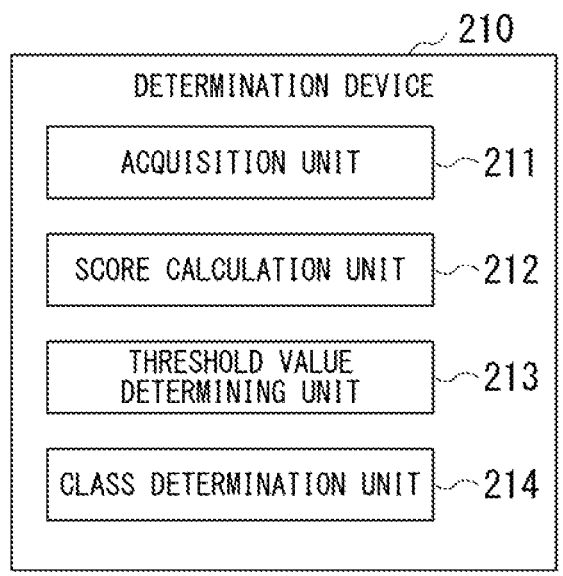
FIG. 18 is a diagram illustrating a configuration example of a determination device according to an eighth embodiment.

FIG. 18 is a diagram illustrating a configuration example of a determination device according to the eighth embodiment.

In the configuration illustrated in FIG. 18, a determination device 210 includes an acquisition unit 211, a score calculation unit 212, a threshold value determining unit 213, and a class determination unit 214.

With such a configuration, the acquisition unit 211 sequentially acquires a plurality of elements included in series data related to a classification target. The score calculation unit 212 calculates an integrated score for the binary classification of the classification target each time the acquisition unit 211 acquires an element. The threshold value determining unit 213 determines the upper limit threshold value and the lower limit threshold value of the integrated score each time the acquisition unit 211 acquires an element. Each time the acquisition unit 211 acquires an element, the class determination unit 214 determines a determination result of the binary classification as either of the two classes or the class indetermination on the basis of comparison between the integrated score and an upper limit threshold value and a lower limit threshold value.

As described above, the threshold value determining unit 213 determines the upper limit threshold value and the lower limit threshold value of the integrated score, and can thus dynamically adjust the relationship between the accuracy of class classification and the time required for classification. In particular, the threshold value determining unit 213 can improve the accuracy of class classification by increasing the upper limit threshold value and decreasing the lower limit threshold value. On the other hand, the threshold value determining unit 213 can reduce the remaining time required for class classification by decreasing the upper limit threshold value and increasing the lower limit threshold value.

Ninth Embodiment

Figure 19:
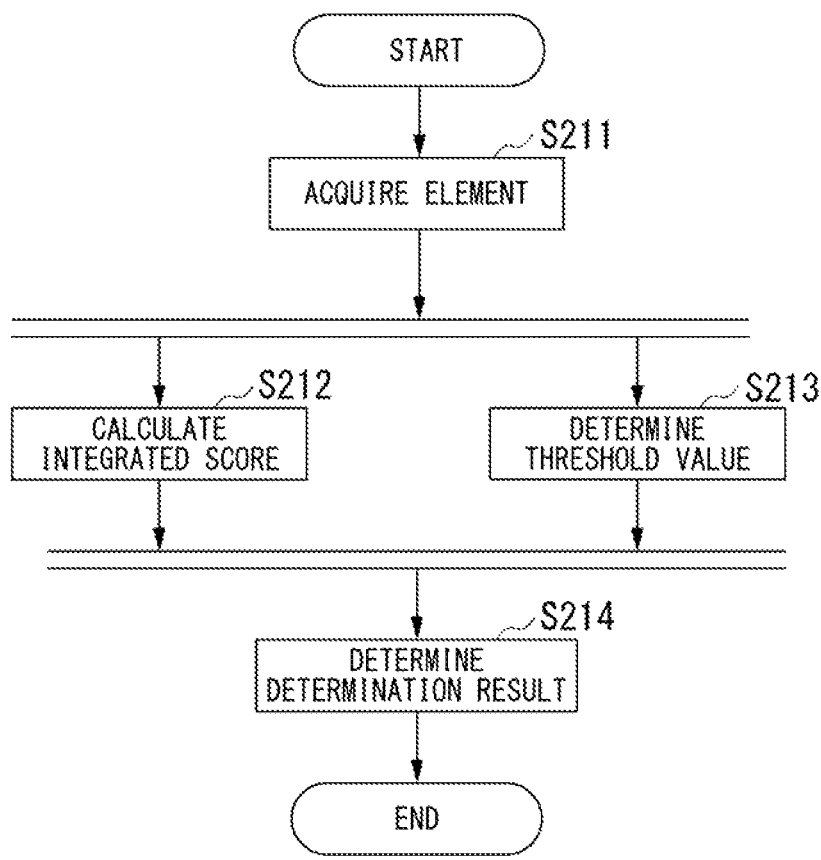
FIG. 19 is a diagram illustrating an example of a process procedure in a determination method according to a ninth embodiment.

FIG. 19 is a diagram illustrating an example of a process procedure in a determination method according to the ninth embodiment.

The determination method illustrated in FIG. 19 includes an element acquisition step (step S211), an integrated score calculation step (step S212), a threshold value determining step (step S213), and a determination result determining step (step S214).

In the element acquisition step (step S211), a plurality of elements included in series data related to a classification target are sequentially acquired. In the integrated score calculation step (step S212), each time an element is acquired, an integrated score for binary classification of the classification target is calculated. In the threshold value determining step (step S213), an upper limit threshold value and a lower limit threshold value of an integrated score are determined each time the element is acquired. In the determination result determining step (step S214), each time the element is acquired, the determination result of the binary classification is determined as either of the two classes or the class indetermination on the basis of comparison between the integrated score and the upper limit threshold value and the lower limit threshold value.

According to the determination method illustrated in FIG. 19, it is possible to dynamically adjust the relationship between the accuracy of class classification and the time required for classification by determining the upper and lower limit threshold values of the integrated score. In particular, it is possible to improve the accuracy of class classification by increasing the upper limit threshold value and decreasing the lower limit threshold value. On the other hand, it is possible to reduce the remaining time required for class classification by decreasing the upper limit threshold value and increasing the lower limit threshold value.

Figure 20:
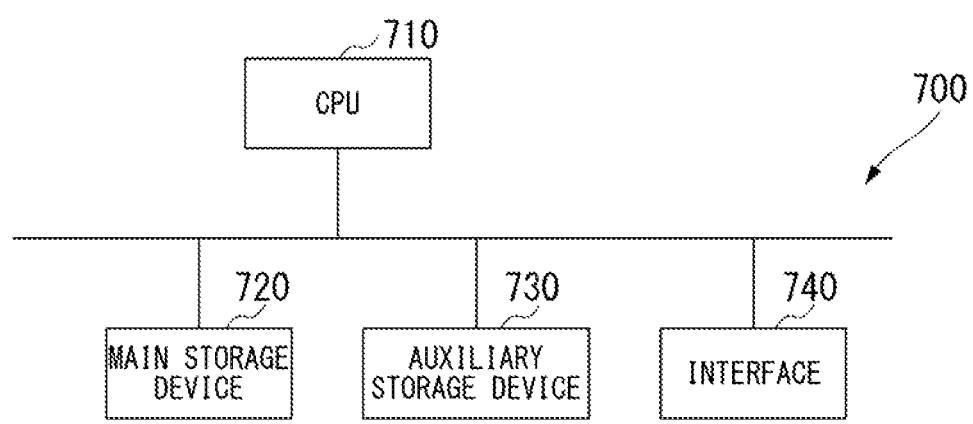
FIG. 20 is a schematic block diagram illustrating a configuration of a computer according to at least one embodiment.

FIG. 20 is a schematic block diagram illustrating a configuration of a computer according to at least one embodiment.

In the configuration illustrated in FIG. 20, a computer 700 includes a CPU 710, a main storage device 720, an auxiliary storage device 730, and an interface 740.

Either or both of the above determination device 100 and determination device 210 may be mounted on the computer 700. In that case, the operation of each of the above processing units is stored in the auxiliary storage device 730 in the form of a program. The CPU 710 reads the program from the auxiliary storage device 730, loads the program to the main storage device 720, and executes the above process according to the program. The CPU 710 secures a storage area corresponding to each of the above storage units in the main storage device 720 according to the program. Communication between each device and other devices is executed by the interface 740 having a communication function performing communication under the control of the CPU 710.

In a case where the determination device 100 is mounted on the computer 700, the operations of the control unit 180 and each unit thereof are stored in the auxiliary storage device 730 in the form of a program. The CPU 710 reads the program from the auxiliary storage device 730, loads the program to the main storage device 720, and executes the above process according to the program.

The CPU 710 secures a storage area corresponding to the storage unit 170 in the main storage device 720 according to the program. Communication performed by the communication unit 110 is executed by the interface 740 having a communication function performing communication under the control of the CPU 710. The function of the display unit 120 is executed by the interface 740 including a display screen displaying an image on the display screen under the control of the CPU 710. The function of the operation input unit 130 is executed by the interface 740 including an input device receiving a user operation.

In a case where the determination device 210 is mounted on the computer 700, the operations of the acquisition unit 211, the score calculation unit 212, the threshold value determining unit 213, and the class determination unit 214 are stored in the auxiliary storage device 730 in the form of a program. The CPU 710 reads the program from the auxiliary storage device 730, loads the program to the main storage device 720, and executes the above process according to the program.

A program for executing all or some of the processes performed by the determination device 100 and the determination device 210 may be recorded on a computer readable recording medium, and the process of each unit may be performed by reading the program recorded on the recording medium into a computer system and executing the program. The term "computer system" as referred to here includes an OS or hardware such as peripheral devices.

The "computer readable recording medium" refers to a portable medium such as a flexible disk, a magneto-optical disk, a ROM, or a CD-ROM, or a storage device such as a hard disk built into a computer system. The above program may be a program for realizing some of the above functions, and may be a program for realizing the above functions in combination with a program already recorded in the computer system.

Although the embodiments have been described in detail with reference to the drawings, a specific configuration is not limited to these embodiments, and includes designs and the like within the scope without departing from the concept of some non-limiting embodiments.

INDUSTRIAL APPLICABILITY

The embodiments may be applied to a determination device, a determination method, and a recording medium.

DESCRIPTION OF REFERENCE SYMBOLS

100 Determination device
110 Communication unit
120 Display unit
130 Operation input unit
170 Storage unit 180 Control unit
181 Acquisition unit
182 Score calculation unit
183 Feature amount calculation unit
184 Individual score calculation unit
185 Integrated score calculation unit
186 Threshold value determining unit
187 Class determination unit
188 Class classification learning unit
189 Training data processing unit
190 Reliability calculation unit
191 Reliability learning unit
192 Reliability evaluation unit
193 Remaining time estimation unit

What is claimed is:

1. A determination device comprising:
a memory storing instructions; and
one or more processors connected to the memory and configured to execute the instructions to:
sequentially acquire a plurality of elements included in series data related to a classification target;
calculate an integrated score for binary classification of the classification target in each time one of the plurality of the elements is acquired;
determine an upper limit threshold value and a lower limit threshold value of the integrated score in each time one of the plurality of the elements is acquired;
determine a determination result of the binary classification as a first class in a case where the integrated score is equal to or more than the upper limit threshold value, determine the determination result as a second class in a case where the integrated score is equal to or less than the lower limit threshold value, and determine the determination result as class indetermination in a case where the integrated score is less than the upper limit threshold value and more than the lower limit threshold value, on a basis of comparison between the integrated score and the upper limit threshold value and the lower limit threshold value in each time one of the plurality of the elements is acquired; and
determine the upper limit threshold value and the lower limit threshold value such that the upper limit threshold value and the lower limit threshold value become a same value in a case where a predetermined end condition is established.

2. The determination device according to claim 1, wherein the one or more processors are configured to further execute the instructions to determine the upper limit threshold value and the lower limit threshold value such that the upper limit threshold value monotonically decreases and the lower limit threshold value monotonically increases according to an increase in a number of the plurality of the elements.

3. The determination device according to claim 1, wherein the one or more processors are configured to further execute the instructions to determine the upper limit threshold value and the lower limit threshold value such that the upper limit threshold value monotonically increases and the lower limit threshold value monotonically decreases according to an increase in a number of the plurality of the elements.

4. The determination device according to claim 1, wherein the one or more processors are configured to further execute the instructions to determine a class of the classification target as a third class in a case where a predetermined end condition is established and the integrated score is less than the upper limit threshold value and more than the lower limit threshold value.

5. A determination method performed by a computer and comprising:
sequentially acquiring a plurality of elements included in series data related to a classification target;
calculating an integrated score for binary classification of the classification target in each time one of the elements is acquired;
determining an upper limit threshold value and a lower limit threshold value of the integrated score in each time one of the elements is acquired;
determining a determination result of the binary classification as a first class in a case where the integrated score is equal to or more than the upper limit threshold value, determining the determination result as a second class in a case where the integrated score is equal to or less than the lower limit threshold value, and determining the determination result as class indetermination in a case where the integrated score is less than the upper limit threshold value and more than the lower limit threshold value, on a basis of comparison between the integrated score and the upper limit threshold value and the lower limit threshold value in each time one of the elements is acquired; and
determining the upper limit threshold value and the lower limit threshold value such that the upper limit threshold value and the lower limit threshold value become a same value in a case where a predetermined end condition is established.

6. A non-transitory recording medium storing a program causing a computer to execute processing comprising:
sequentially acquiring a plurality of elements included in series data related to a classification target;
calculating an integrated score for binary classification of the classification target in each time one of the elements is acquired;
determining an upper limit threshold value and a lower limit threshold value of the integrated score in each time one of the elements is acquired;
determining a determination result of the binary classification as a first class in a case where the integrated score is equal to or more than the upper limit threshold value, determining the determination result as a second class in a case where the integrated score is equal to or less than the lower limit threshold value, and determining the determination result as class indetermination in a case where the integrated score is less than the upper limit threshold value and more than the lower limit threshold value, on a basis of comparison between the integrated score and the upper limit threshold value and the lower limit threshold value in each time one of the elements is acquired; and
determining the upper limit threshold value and the lower limit threshold value such that the upper limit threshold value and the lower limit threshold value become a same value in a case where a predetermined end condition is established.

* * * * *